US012728075B2

(12) United States Patent
Lewis

(10) Patent No.: US 12,728,075 B2
(45) Date of Patent: Sep. 8, 2026

(54) METHODS, SYSTEMS, APPARATUSES, AND DEVICES FOR FACILITATING DISPENSING OF MEDICATIONS

(71) Applicant: Victor Herman Lewis, West Palm Beach, FL (US)

(72) Inventor: Victor Herman Lewis, West Palm Beach, FL (US)

( * ) Notice: Subject to any disclaimer, the term of this patent is extended or adjusted under 35 U.S.C. 154(b) by 377 days.

(21) Appl. No.: 18/444,244

(22) Filed: Feb. 16, 2024

(65) Prior Publication Data

US 2024/0189190 A1 Jun. 13, 2024

Related U.S. Application Data

(63) Continuation-in-part of application No. 15/593,038, filed on May 11, 2017, now Pat. No. 10,420,707, and a continuation-in-part of application No. 17/519,235, filed on Nov. 4, 2021, now Pat. No. 12,071,301, which is a continuation-in-part of application No. 16/543,827, filed on Aug. 19, 2019, now Pat. No. 11,166,880.

(60) Provisional application No. 62/426,687, filed on Nov. 28, 2016, provisional application No. 62/334,859, filed on May 11, 2016.

(51) Int. Cl.
*A61J 7/00* (2006.01)

(52) U.S. Cl.
CPC .................................. *A61J 7/0076* (2013.01)

(58) Field of Classification Search
CPC .......... A61J 7/0076; A61J 1/1418; A61J 1/18; A61J 1/03; A61J 2200/70; A61J 2200/72; A61J 7/0084; A61J 7/0445; A61J 7/0481; G07F 9/10; G07F 11/44; G07F 17/0092; G16H 20/10
See application file for complete search history.

(56) References Cited

U.S. PATENT DOCUMENTS 3,095,085 A * 6/1963 Meijer .................. B65D 25/04 206/536
4,204,611 A * 5/1980 Graves ...................... A61J 7/04 206/534
4,381,059 A * 4/1983 Schurman ................. A61J 7/04 206/533

(Continued)

*Primary Examiner* — Michael Collins

(57) ABSTRACT

An apparatus for facilitating dispensing of medications includes a housing comprising an interior space and an opening, a cover coupled with the housing for closing the opening, a medication holder holding a medication disposed in the interior space, a holder driving element, and an actuator for transitioning the holder driving element between positions based on a dispensing information. The housing and the cover are transitionable between a dispensing state and a non-dispensing state. The medication is dispensable through the opening in the dispensing state and not dispensable through the opening in the non-dispensing state. The medication holder includes a coupling element for movably coupling the medication holder with the holder driving element. The transitioning moves the medication holder between a non-dispensable position and a dispensable position. The medication is accessible for dispensing in the dispensable position and the medication is not accessible for the dispensing in the non-dispensable position.

20 Claims, 20 Drawing Sheets

(56) References Cited

U.S. PATENT DOCUMENTS

| | | | | |
|---|---|---|---|---|
| 4,572,403 | A * | 2/1986 | Benaroya | A61J 7/04 221/76 |
| 9,150,346 | B1 * | 10/2015 | Aramian | A61J 7/04 |
| 10,420,707 | B2 | 9/2019 | Lewis | |
| 11,464,709 | B2 * | 10/2022 | Brown | A61J 7/0084 |
| 2009/0120042 | A1 | 5/2009 | Zieher | |
| 2010/0106291 | A1 | 4/2010 | Campbell | |
| 2010/0318218 | A1 | 12/2010 | Muncy | |
| 2011/0215109 | A1 | 9/2011 | Bailey | |
| 2013/0030566 | A1 | 1/2013 | Shavelsky | |
| 2013/0197693 | A1 | 8/2013 | Kamen | |
| 2014/0172161 | A1 | 6/2014 | Norris | |
| 2014/0278508 | A1 | 9/2014 | Akdogan | |
| 2014/0297028 | A1 | 10/2014 | Bilotti | |
| 2015/0227127 | A1 | 8/2015 | Miller | |
| 2022/0125738 | A1 * | 4/2022 | Lafauci | G16H 20/10 |
| 2023/0372329 | A1 * | 11/2023 | Iorio | A61J 7/0445 |

* cited by examiner

METHODS, SYSTEMS, APPARATUSES, AND DEVICES FOR FACILITATING DISPENSING OF MEDICATIONS

FIELD OF THE INVENTION

Generally, the present disclosure relates to the field of article dispensing. More specifically, the present disclosure relates to methods, systems, apparatuses, and devices for facilitating dispensing of medications.

BACKGROUND OF THE INVENTION

Existing apparatuses for dispensing medications are deficient with regard to several aspects. For instance, the medications stored in the current apparatuses for dispensing are prone to contamination. As a result, different apparatuses are needed that prevent the contamination of the medications stored for dispensing. Furthermore, the medications stored in the current apparatuses for dispensing are also prone to weather elements that may damage the medication. As a result, different apparatuses are needed that prevent damage to the medication stored for dispensing.

Therefore, there is a need for improved methods, systems, apparatuses, and devices for facilitating dispensing of medications that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating dispensing of medications, in accordance with some embodiments. Accordingly, the apparatus may include a housing, a cover, at least one medication holder, a holder driving element, and at least one actuator. Further, the housing may include a housing base wall and a housing side wall peripherally extending from the housing base wall defining an interior space. Further, the housing side wall may include at least one opening leading into the interior space. Further, the cover may be configured to be coupled with the housing for closing the at least one opening. Further, at least one of the housing and the cover may be transitionable between at least one dispensing state and at least one non-dispensing state. Further, the at least one medication holder may be disposed in the interior space. Further, each of the at least one medication holder holds at least one medication. Further, the at least one medication held by the at least one medication holder may be dispensable through the at least one opening in the at least one dispensing state. Further, the at least one medication held by the at least one medication holder may be not dispensable through the at least one opening in the at least one non-dispensing state. Further, the holder driving element may be disposed in the interior space. Further, each of the at least one medication holder may include a coupling element for movably coupling each of the at least one medication holder with the holder driving element using the coupling element. Further, the at least one actuator may be disposed in the interior space. Further, the at least one actuator may be operatively coupled with the holder driving element. Further, the at least one actuator may be configured for transitioning the holder driving element between a plurality of positions based on at least one dispensing information. Further, the transitioning of the holder driving element moves the at least one medication holder between at least one non-dispensable position and at least one dispensable position. Further, the at least one medication held by the at least one medication holder may be accessible for dispensing in the at least one dispensable position. Further, the at least one medication held by the at least one medication holder may be not accessible for the dispensing in the at least one non-dispensable position.

Further disclosed herein is an apparatus for facilitating dispensing of medications, in accordance with some embodiments. Accordingly, the apparatus may include a housing, a cover, at least one medication holder, a holder driving element, and at least one actuator. Further, the housing may include a housing base wall and a housing side wall peripherally extending from the housing base wall defining an interior space. Further, the housing side wall may include at least one opening leading into the interior space. Further, the housing side wall may include a top end and a bottom end. Further, the bottom end of the housing side wall may be peripherally attached to the housing base wall. Further, the top end defines the at least one opening. Further, the cover may be configured to be coupled with the housing for closing the at least one opening. Further, at least one of the housing and the cover may be transitionable between at least one dispensing state and at least one non-dispensing state. Further, the cover may be configured to be removably coupled with the housing for removably closing the at least one opening. Further, the cover closes the at least one opening in the at least one non-dispensing state. Further, the cover does not close the at least one opening in the at least one dispensing state. Further, the at least one medication holder may be disposed in the interior space. Further, each of the at least one medication holder holds at least one medication. Further, the at least one medication held by the at least one medication holder may be dispensable through the at least one opening in the at least one dispensing state. Further, the at least one medication held by the at least one medication holder may be not dispensable through the at least one opening in the at least one non-dispensing state. Further, the holder driving element may be disposed in the interior space. Further, each of the at least one medication holder may include a coupling element for movably coupling each of the at least one medication holder with the holder driving element using the coupling element. Further, the at least one actuator may be disposed in the interior space. Further, the at least one actuator may be operatively coupled with the holder driving element. Further, the at least one actuator may be configured for transitioning the holder driving element between a plurality of positions based on at least one dispensing information. Further, the transitioning of the holder driving element moves the at least one medication holder between at least one non-dispensable position and at least one dispensable position. Further, the at least one medication held by the at least one medication holder may be accessible for dispensing in the at least one dispensable position. Further, the at least one medication held by the at least one medication holder may be not accessible for the dispensing in the at least one non-dispensable position.

Further disclosed herein is an apparatus for facilitating dispensing of medications, in accordance with some embodiments. Accordingly, the apparatus may include a housing, a cover, at least one medication holder, a holder driving element, and at least one actuator. Further, the housing may include a housing base wall and a housing side wall peripherally extending from the housing base wall defining an interior space. Further, the housing side wall may include at least one opening leading into the interior space. Further, the cover may be configured to be coupled with the housing for closing the at least one opening. Further, at least one of the housing and the cover may be transitionable between at least one dispensing state and at least one non-dispensing state. Further, the cover may be configured to be removably coupled with the housing for removably closing the at least one opening. Further, the cover closes the at least one opening in the at least one non-dispensing state. Further, the cover does not close the at least one opening in the at least one dispensing state. Further, the at least one medication holder may be disposed in the interior space. Further, each of the at least one medication holder holds at least one medication. Further, the at least one medication held by the at least one medication holder may be dispensable through the at least one opening in the at least one dispensing state. Further, the at least one medication held by the at least one medication holder may be not dispensable through the at least one opening in the at least one non-dispensing state. Further, the holder driving element may be disposed in the interior space. Further, each of the at least one medication holder may include a coupling element for movably coupling each of the at least one medication holder with the holder driving element using the coupling element. Further, the at least one actuator may be disposed in the interior space. Further, the at least one actuator may be operatively coupled with the holder driving element. Further, the at least one actuator may be configured for transitioning the holder driving element between a plurality of positions based on at least one dispensing information. Further, the transitioning of the holder driving element moves the at least one medication holder between at least one non-dispensable position and at least one dispensable position. Further, the at least one medication held by the at least one medication holder may be accessible for dispensing in the at least one dispensable position. Further, the at least one medication held by the at least one medication holder may be not accessible for the dispensing in the at least one non-dispensable position. Further, the cover may include at least one cover opening. Further, the transitioning of the cover between the at least one dispensing state and the at least one non-dispensing state decoupably couples the at least one cover opening with the at least one opening. Further, the at least one cover opening may be coupled with the at least one opening in the at least one dispensing state for allowing the dispensing of the at least one medication held by the at least one medication holder. Further, the at least one cover opening may not be coupled with the at least one opening in the at least one non-dispensing state for restricting the dispensing of the at least one medication held by the at least one medication holder. Further, the at least one medication holder may be in the at least one dispensing position.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
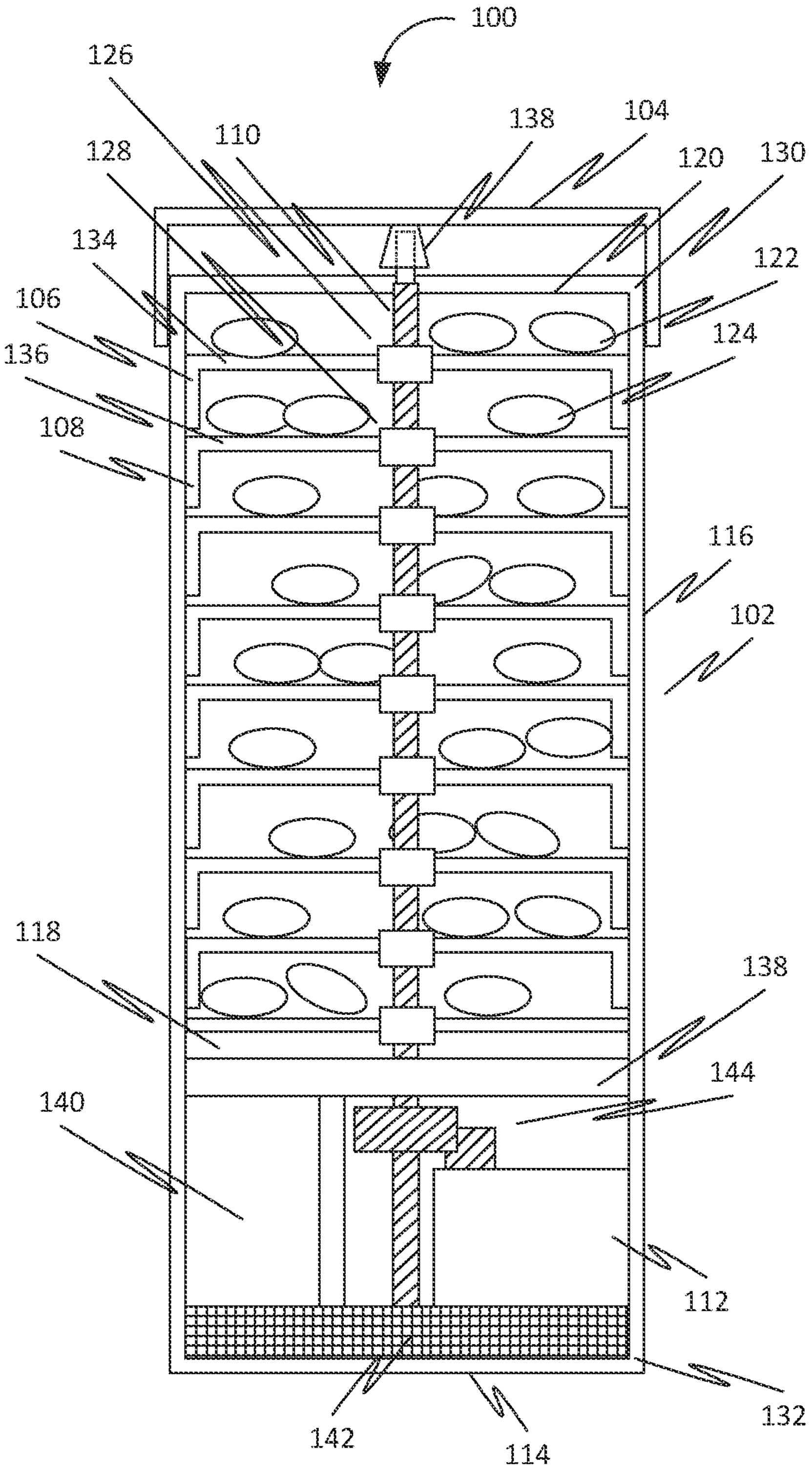
FIG. 1 is a front cross sectional view of an apparatus 100 for facilitating dispensing of medications, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating dispensing of medications, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

OVERVIEW

The present disclosure describes methods, systems, apparatuses, and devices for facilitating dispensing of medications.

Further, the present disclosure describes a cylindrical Pill-Locker. The cylindrical Pill-Locker is designed to provide a dispenser that is made waterproof by using a screw-down cap and gasket and a cylindrical housing. Further, the cylindrical Pill-Locker is an automated medication dispenser that is waterproof and can be submerged to a depth of 1-3 meters in salt water and retain its functionality. Further, the cylindrical enclosure may be made of plastic or stainless steel tube of appropriate length with waterproof caps on either one or both ends to provide the seal. Further, the cylindrical Pill-Locker includes a waterproof screw-on cap, a drive screw, an inverted pan or disk, pills, a brass ferrule attached to the inverted pan or disk, a cylinder enclosure, a drive screw lock, a drive screw gear, a motor gear, a drive motor, a battery, and a circuit board. Further, the cylindrical Pill-Locker provides secure, automated medication dispense with a traditional cylindrical shape and waterproof sealing cap. The cells are formed by stacking spaced, inverted pans or disks that separate the doses. The pans, inverted pans, or disks are either linked or free floating and are advanced by a computer controlled screw drive turning individual, single, or linked ferrule assemblies. Further, the cylindrical Pill-Locker may include a stationary wedge that prevents the inverted pan or disk from turning with the drive screw and allow moving the inverted pan or disk upward and downward as the drive screw turns. Further, the stationary wedge prevents the pan or disk from turning with the drive screw. Instead, the pan, inverted pan, or disk will raise and lower depending on the direction that the screw turns. As medication is consumed, the inverted pan or disk can be discarded, or if all of the disks are linked, they can be retracted back into the cylinder enclosure. Further, the pan or disk may include dose dividers disposed on the surface of the pan or disk. The Pill Compartment can be either a flat disk, a sealed pan, an inverted pan, or a disk that can be disposable or permanent and connected with other pans or free floating on the drive screw. Further, the inverted pan, or disk and ferrule are slotted so that it can be slid sideways to disconnect from the drive screw and the slotted cylinder enclosure. Further, the screw-on cap contains a waterproof gasket and a centered drive screw bearing to brace the drive screw end in the underside of the cap. Further, the screw-on cap may include a threaded portion.

Further, the cylindrical Pill-Locker has two different designs.

Further, the design "A" uses a short cap with a small ferrule or bearing to accept the live end of the drive screw when the cylindrical Pill-Locker is closed. The drive screw, motor, and controller work cooperatively for dispensing medications. Further, the cylindrical Pill-Locker uses a series of round pans, round inverted pans, or disks made of either plastic or metal or some laminate. In some cases, the medication will be sealed to the disks or pans and dispensed as a sealed unit. An alternative method would be that the disk or pan will be disposable and the medication will drop into the patient's hand when the cylindrical enclosure is inverted. The individual disks or pans will have internally threaded brass or similar ferrules that will move up and down as the drive screw rotates. The disks or pans may be free-floating or attached to each other permanently as a reusable unit or in such a way that the user can break off the disk or pan once it clears the lip of the cylinder enclosure. The disk or pan can also be slotted to slide off the drive screw once the disk or pan has cleared the lip of the cylinder. A Stationary Wedge on the inside of the cylinder enclosure matches a notch in the disk or pan to prevent it from rotating as the drive screw turns. This causes the disk or pan to move up and down as the drive screw turns clockwise or counter-clockwise. There is also a drive screw lock which prevents manual rotation of the drive screw by the user. Attempts to force the screw to turn will lock it completely using a spring lock or similar.

Further, the design "B" uses a long cap with screw threads either on the front, back, or somewhere on the cap. The cylinder is sealed at both ends and the pills and disks or trays are dispensed through a slot in the side of the cylinder. The drive screw, motor, and controller work in a fashion similar to the design "A". The cap on Design "B" will either retract to expose the slot on the cylinder or the cap will have a matching slot that will align with a similar slot in the cylinder. Nylon expansion seals may also be used to ensure waterproof functionality. Further, the design "B" of the cylindrical Pill-Locker includes a water proof screw-on cap, a cylinder wall, a drive screw, a cap slot, a cylinder slot, an inverted pan or disk, pills, a brass ferrule attached to the inverted pan or disk, a cylinder enclosure, a drive screw lock, a drive screw gear, a motor gear, a drive motor, a battery, and a circuit board. In the design "B", the cap is not removed for dispensing, but extends over the pill trays (pans, inverted pans, or disks) and pills are advanced and dispensed though a slot in the side that either matches a slot in the cap or is exposed as the cap is screwed out to expose a slot.

Further, the cylindrical pill locker is a programmable medication dispenser (Pill-Lockers). Further, the programmable medication dispenser may be at least one of a portable, a secured, and an automated dispenser for prescription medications. Further, the programmable medication dispenser may prevent patients from accidentally or deliberately abusing medications. Further, the programmable medication dispenser may remind the patients to take the medications at the prescribed time.

Further, the programmable medication dispenser may include a plurality of sizes, shapes, and colors. Further, the programmable medication dispenser may be configured for any application or any medication prescribed to the patients.

Further, the programmable medication dispenser may include a micro-controller. Further, the micro-controller may be capable of operating up to 100 trays over a 10-year prescription duration. Further, the microcontroller may be programmed using a smartphone, a laptop, etc. using a Bluetooth, a USB, or an RS232 connection. Further, the programmable medication dispenser may include a plurality of options. Further, the options may include LED Readout, speech, encapsulation, and network and cloud software compatibility.

Further, the programmable medication dispenser may include a drive motor. Further, the drive motor may include a custom-designed stepper motor. Further, the custom-designed stepper motor may be controlled by the microcontroller to provide the instant and precise "micro-motions" necessary for accurate dispensing of medication.

Further, the programmable medication dispenser may include a dispenser drive. Further, the dispenser drive may include custom die-rolled stainless-steel drive screws and a stainless-steel micro-bearing technology. Further, parts of the dispenser drive may include stainless steel, sintered Aluminum alloy, brass, and nylon.

Further, the programmable medication dispenser may include medication trays. Further, the medication trays may be interchangeable and disposable. Further, the medication trays may include Food and Drug Administration (FDA) approved food grade plastic, acrylic, or stainless steel. Further, the medication trays may be easily removed for cleaning or replacement. Further, the programmable medication dispenser may be configured with a plurality of sizes of the medication trays having individual cells configured to match pill and capsule shapes and dosage frequency. Further, the medication trays may be prepackaged with the medications by at least one of manufacturers, in-house pharmacies, and compounding pharmacies.

Further, the programmable medication dispenser may include a secure enclosure. Further, the secure enclosure may include at least one of plastic, acrylic, aluminum, cast alloy, and stainless steel. Further, the at least one of plastic, acrylic, aluminum, cast alloy, and stainless steel may allow for different levels of security. Further, the programmable medication dispenser may include a "Medication Self-Destruct" option. Further, the programmable medication dispenser may be designed to be disassembled and sterilized using temperature and/or chemical gas. Further, the programmable medication dispenser may have food grade Teflon floors that may be removed by a user for cleaning. Further, manufacturers and agencies may handle possession of the programmable medication dispenser. Further, the manufacturers and the agencies may rent and lease the programmable medication dispenser to the user. Further, the programmable medication dispenser may be upgraded, refurbished, re-programmed, and re-purposed.

Further, the programmable medication dispenser may include a patient-accessible compartment for one or two "emergency doses" of the medication in the case of any failure to dispense the medications. Further, the programmable medication dispenser may provide assistance through a local pharmacy.

Further, the programmable medication dispenser may immediately end overuse, illegal Sale, and "Gifting" of dangerous medications.

Further, the programmable medication dispenser may prevent overdose. Further, the programmable medication dispenser may dispense the medications based on a prescription provided by at least one physician. Further, the programmable medication dispenser may dispense the medications at a time prescribed in the prescription.

Further, the programmable medication dispenser may be completely tamper-proof. Further, the programmable medication dispenser may include an internal system that may neutralize the medications if an external shield may be breached. Further, in a case of theft, a global positioning system (GPS) included in the programmable medication dispenser may record and transmit the location of the programmable medication dispenser.

FIG. 1 is a front cross sectional view of an apparatus 100 for facilitating dispensing of medications, in accordance with some embodiments. Accordingly, the apparatus 100 may include a housing 102, a cover 104, at least one medication holder 106-108, a holder driving element 110, and at least one actuator 112. Further, the apparatus 100 may include a cylindrical Pill Locker.

Further, the housing 102 may include a housing base wall 114 and a housing side wall 116 peripherally extending from the housing base wall 114 defining an interior space 118. Further, the housing side wall 116 may include at least one opening (such as an opening 120) leading into the interior space 118. Further, the housing base wall 114 may be circularly shaped. Further, the housing side wall 116 may be cylindrically shaped. Further, the housing side wall 116 extends from a top side of the housing base wall 114.

Further, the cover 104 may be configured to be coupled with the housing 102 for closing the at least one opening (such as the opening 120). Further, at least one of the housing 102 and the cover 104 may be transitionable between at least one dispensing state and at least one non-dispensing state. Further, the cover 104 may include a lid, a water proof screw-on cap, a cap, etc.

Further, the at least one medication holder 106-108 may be disposed in the interior space 118. Further, the at least one medication holder 106-108 may include a disk, a pan, an inverted pan, etc. Further, each of the at least one medication holder 106-108 holds at least one medication (122 and 124). Further, the at least one medication (122 and 124) may include a number of pills, tablets, capsules, etc. Further, the at least one medication (122 and 124) may be comprised in each of the at least one medication holder 106-108. Further, the at least one medication (122 and 124) held by the at least one medication holder 106-108 may be dispensable through the at least one opening (such as the opening 120) in the at least one dispensing state. Further, the at least one medication (122 and 124) held by the at least one medication holder 106-108 may be not dispensable through the at least one opening (such as the opening 120) in the at least one non-dispensing state. Further, the at least one medication holder 106-108 may be comprised of at least one tearable material. Further, the at least one medication holder 106-108 may be tearable based on the at least one tearable material. Further, the at least one tearable material may include a composite of at least one of a paper, a plastic, a fabric, etc. Further, the at least one medication holder 106-108 may be spacedly disposed in the interior space 118. Further, the at least one medication holder 106-108 may include a plurality of medication holders. Further, at least one first medication holder of the plurality of medication holders may be connected to at least one second medication holder of the plurality of medication holders for moving simultaneously in the interior space 118.

Further, the holder driving element 110 may be disposed in the interior space 118. Further, the holder driving element 110 may include a drive screw. Further, each of the at least one medication holder 106-108 may include a coupling element (126 and 128) for movably coupling each of the at least one medication holder 106-108 with the holder driving element 110 using the coupling element (126 and 128). Further, the coupling element (126 and 128) may include a ferrule.

Further, the at least one actuator 112 may be disposed in the interior space 118. Further, the at least one actuator 112 may be electrically powered through at least one battery 140. Further, the at least one battery 140 may electrically power the at least one actuator 112. Further, the at least one actuator 112 may be operatively coupled with the holder driving element 110. Further, the operatively coupling may be based on at least one gear assembly 144 comprising a drive screw gear, a motor gear, etc. Further, the at least one actuator 112 may be configured for transitioning the holder driving element 110 between a plurality of positions based on at least one dispensing information. Further, the at least one dispensing information may include a schedule, a prescription, etc., associated with the at least one medication. Further, the at least dispensing information may be communicated to the at least one actuator 112 through at least one of a communication interface, a processing device, and a storage device comprised in a circuit board 142. Further, at least one of the communication interface, the processing device, and the storage device may be communicatively coupled with the at least one actuator 112. Further, the transitioning of the holder driving element 110 moves the at least one medication holder 106-108 between at least one non-dispensable position and at least one dispensable position. Further, the at least one medication (122 and 124) held by the at least one medication holder 106-108 may be accessible for dispensing in the at least one dispensable position. Further, the at least one medication (122 and 124) held by the at least one medication holder 106-108 may be not accessible for the dispensing in the at least one non-dispensable position. Further, the at least one actuator may include an electric motor. Further, the electric motor may include a servo motor, a stepper motor, etc.

Further, in some embodiments, the housing side wall 116 may include a top end 130 and a bottom end 132. Further, the bottom end 132 of the housing side wall 116 may be peripherally attached to the housing base wall 114. Further, the top end 130 defines the at least one opening (such as the opening 120).

Figure 2:
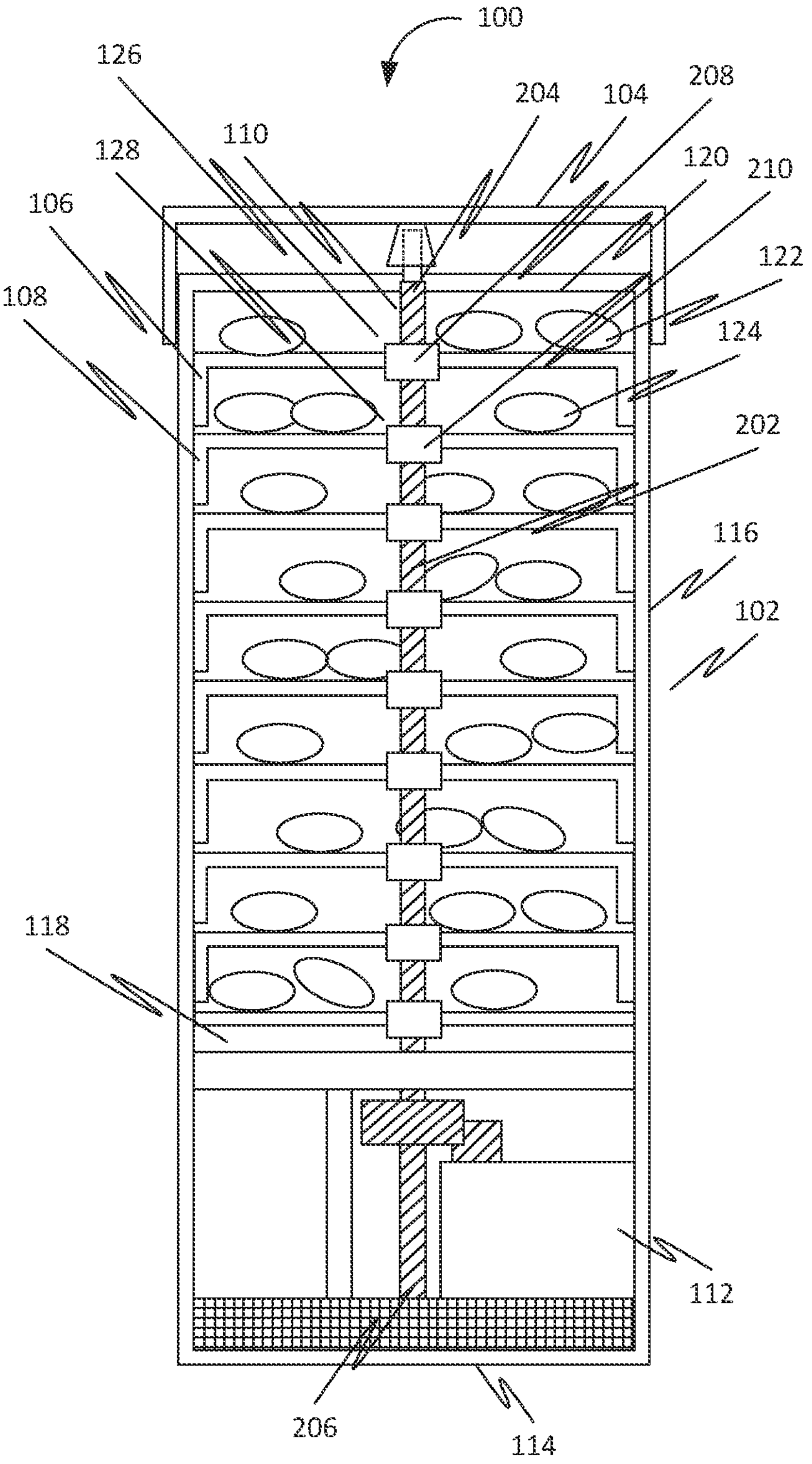
FIG. 2 is a front cross sectional view of the apparatus 100, in accordance with some embodiments.

Further, in some embodiments, the holder driving element 110 may include a shaft 202, as shown in FIG. 2 extending between a first end 204 and a second end 206. Further, the shaft 202 may be threaded. Further, the shaft 202 may be externally threaded. Further, the coupling element (126 and 128) may include a threaded coupling element (208 and

210). Further, the threaded coupling element (208-210) may be internally threaded. Further, the threaded coupling element (208 and 210) of each of the at least one medication holder 106-108 may be threadedly coupled with the shaft 202. Further, the movably coupling of each of the at least one medication holder 106-108 with the holder driving element 110 may be based on the threadedly coupling of the threaded coupling element (208 and 210) with the shaft 202.

Further, in some embodiments, the transitioning of the holder driving element 110 may include rotating the holder driving element 110 between the plurality of positions. Further, the rotating may include rotating in at least one of a clockwise direction and an anticlockwise direction in relation to the holder driving element 110 to at least one degree of rotation from a reference position. Further, the rotating of the holder driving element 110 moves the at least one medication holder 106-108 between the at least one non-dispensable position and the at least one dispensable position. Further, the moving of the at least one medication holder 106-108 may include displacing of the at least one medication holder 106-108 between the at least one non-dispensable position and the at least one dispensable position.

Further, in some embodiments, the at least one medication holder 106-108 may include a base wall (134 and 136). Further, the base wall (134 and 136) may be circularly shaped.

Figure 10:
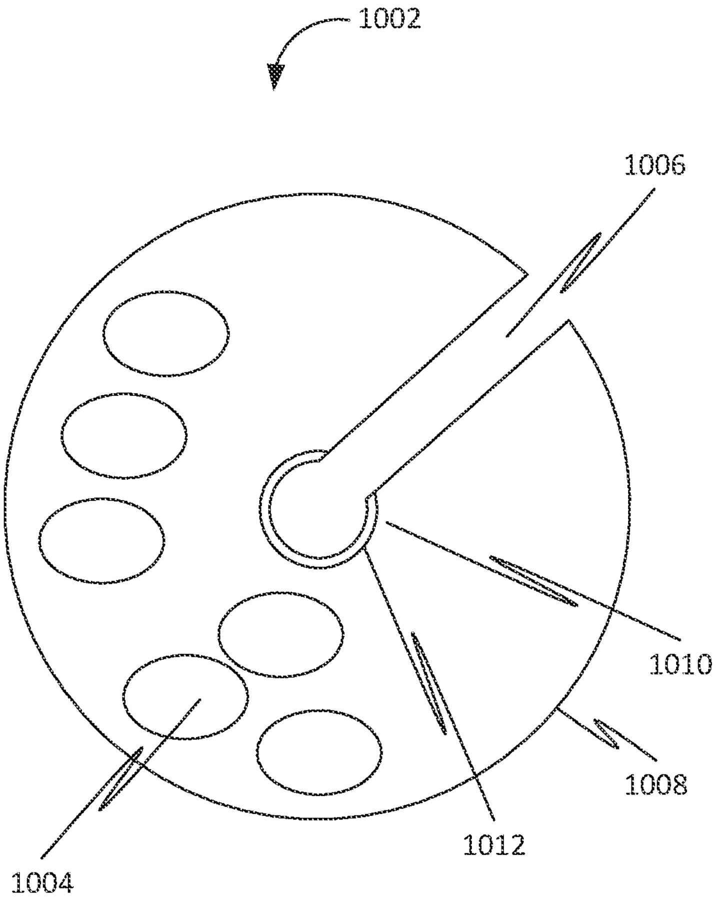
FIG. 10 is a top view of a medication holder 1002 of the apparatus 100, in accordance with some embodiments.

Further, in some embodiments, the at least one medication holder 106-108 may include at least one slot (slot 1006, as shown in FIG. 10) extending from a periphery (periphery 1008, as shown in FIG. 10) of the at least one medication holder 106-108 to at least one location (location 1010, as shown in FIG. 10) on the at least one medication holder 106-108. Further, the coupling element (126 and 128) may be comprised in at least one medication holder 106-108 in the at least one location. Further, the holder driving element 110 may include the shaft 202 extending between the first end 204 and the second end 206. Further, the at least one medication holder 106-108 may be laterally positioned on the shaft 202 by inserting the at least one medication holder 106-108 into the shaft 202 through the at least one slot for coupling the at least one of the medication holder 106-108 to the holder driving element 110 using the coupling element (126 and 128). Further, the at least one medication holder 106-108 may be removably insertable into the shaft 202 through the at least one slot for removably coupling the at least one of the medication holder 106-108 to the holder driving element 110 using the coupling element (126 and 128).

In further embodiments, the apparatus 100 may include a driving lock mechanism 138. Further, the driving lock mechanism may include a spring lock mechanism. Further, the driving lock mechanism 138 may be disposed in the interior space 118. Further, the driving lock mechanism 138 may be coupled with the holder driving element 110. Further, the driving lock mechanism 138 may be configured to be transitioned between an engaged state and a disengaged state. Further, the driving lock mechanism 138 allows the transitioning of the holder driving element 110 in the disengaged state. Further, the driving lock mechanism 138 prevents the transitioning of the holder driving element 110 in the engaged state.

Further, in an embodiment, the at least one actuator 112 may be further operatively coupled with the driving lock mechanism 138. Further, the at least one actuator 112 may be configured for transitioning the driving lock mechanism 138 from the engaged state to the disengaged state before the transitioning of the holder driving element 110. Further, the at least one actuator 112 may be configured for transitioning the driving lock mechanism 138 from the disengaged state to the engaged state after the transitioning of the holder driving element 110 for preventing a transitioning of the holder driving element 110 based on at least one external force applicable to the holder driving element 110.

Figure 9:
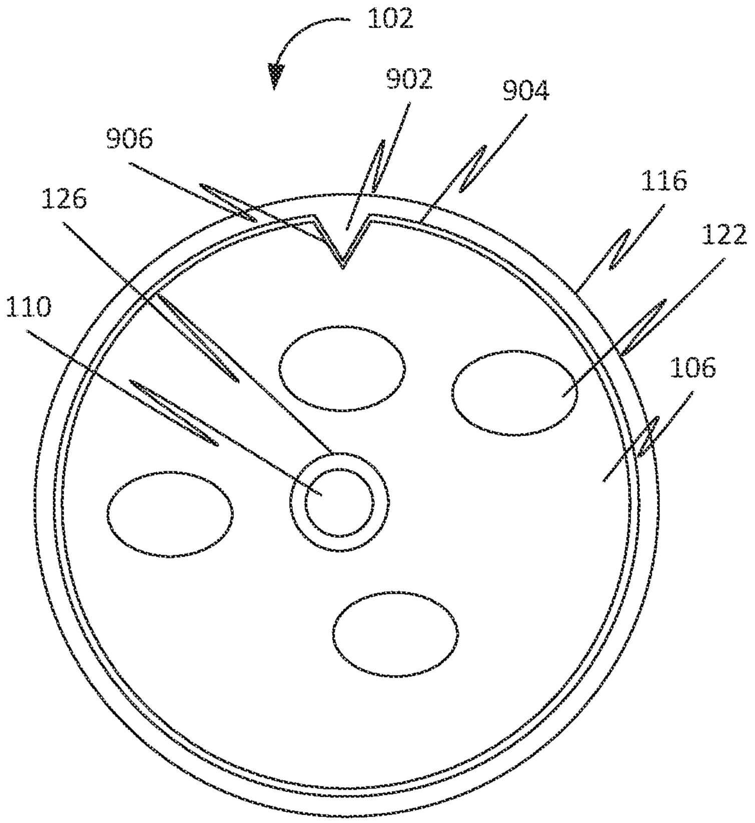
FIG. 9 is a top view of the housing 102 of the apparatus 100, in accordance with some embodiments.

Further, in some embodiments, the housing 102 may include a wedge 902, as shown in FIG. 9, disposed on an interior surface 904, as shown in FIG. 9, of the housing side wall 116. Further, the wedge 902 extends along a length of the interior space 118. Further, the wedge 902 may be engaged with a recess 906, as shown in FIG. 9, comprised in the at least one medication holder 106-108. Further, the transitioning of the holder driving element 110 may include rotating the holder driving element 110 between the plurality of positions. Further, the at least one medication holder 106-108 moves along the length of the interior space 118 between the at least one non-dispensable position and the at least one dispensable position based on the rotating of the holder driving element 110 and the engaging of the wedge 902 with the recess 906.

Further, in some embodiments, the cover 104 may be configured to be removably coupled with the housing 102 for openably closing the at least one opening (such as the opening 120). Further, the cover 104 closes the at least one opening (such as the opening 120) in the at least one non-dispensing state. Further, the cover 104 opens the at least one opening (such as the opening 120) in the at least one dispensing state.

Further, in some embodiments, the cover 104 may be configured for forming at least one watertight seal with at least one portion of the housing 102 based on the coupling of the cover 104 with the housing 102.

Figure 5:
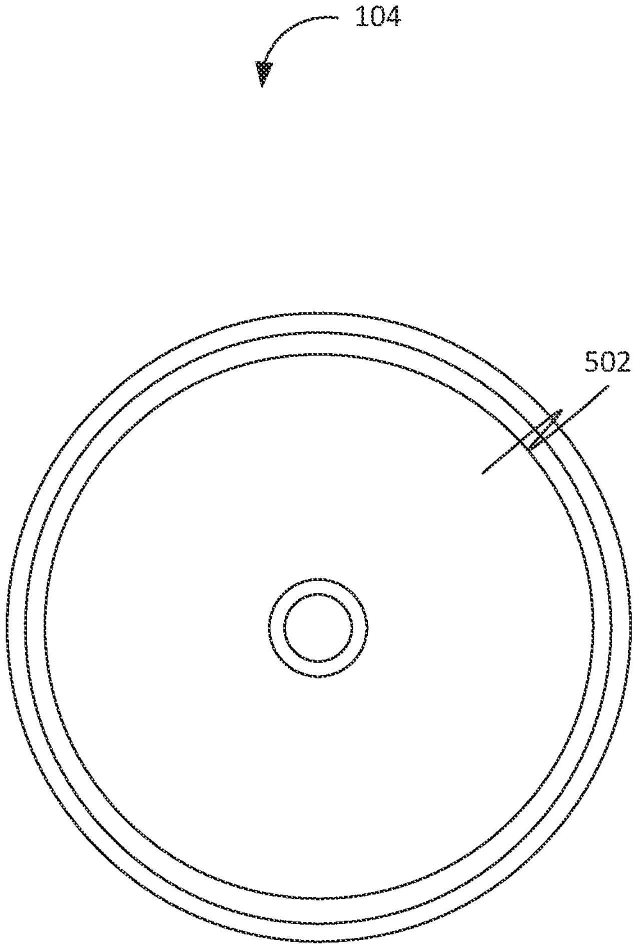
FIG. 5 is a bottom view of the cover 104 of the apparatus 100, in accordance with some embodiments.

Further, in some embodiments, the cover 104 may include at least one seal creating element 502, as shown in FIG. 5. Further, the at least one seal creating element 502 forms the at least one watertight seal between at least one cover surface of the cover 104 and at least one surface of the at least one portion of the housing 102. Further, the at least one seal creating element 502 may include a Nylon expansion seal, a gasket, a shape memory polymer, etc. Further, the shape memory polymer may include polytetrafluoroethylene (PFTE), polylactide (PLA), ethylene-vinyl acetate (EVA), etc.

Figure 6:
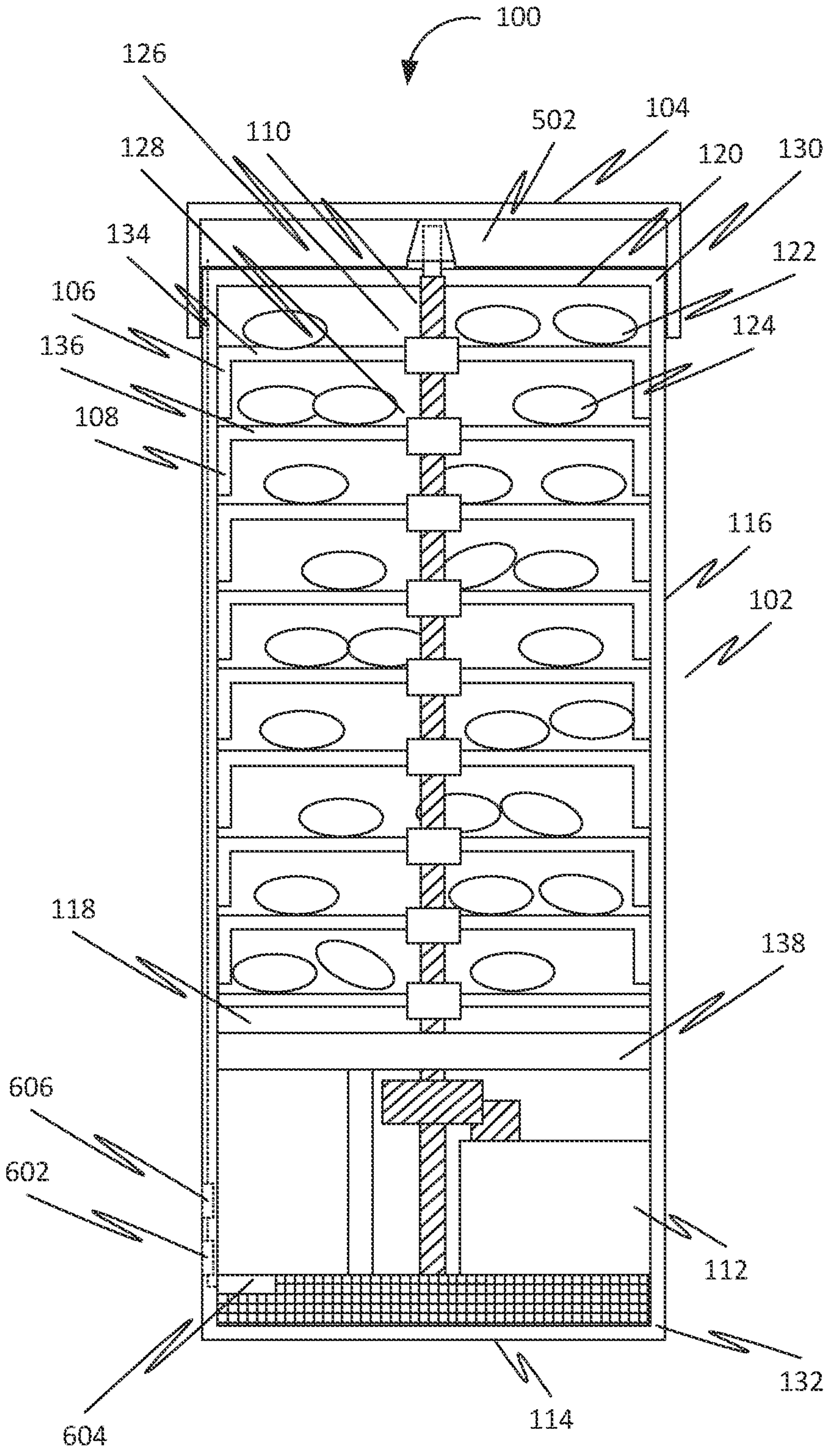
FIG. 6 is a front cross sectional view of the apparatus 100, in accordance with some embodiments.

In an embodiment, the apparatus 100 may include at least one sensor 602, a processing device 604, and at least one device 606, as shown in FIG. 6. Further, the at least one sensor 602 may be disposed on the housing 102. Further, the at least one sensor 602 may include a pressure sensor, a temperature sensor, a moisture sensor, etc. Further, the at least one sensor 602 may be configured for detecting at least one condition detrimental to the at least one watertight seal. Further, the at least one condition may include a submerging of the apparatus 100 into water, a presence of a pressurized environment around the apparatus 100, a temperature change in an environment of the apparatus 100, a precipitation in the environment of the apparatus 100, etc. Further, the processing device 604 may be communicatively coupled with the at least one sensor 602. Further, the processing device 604 may be configured for generating at least one condition information associated with the at least one condition based on the detecting. Further, the processing device 604 may be configured for determining a modification in at least one characteristic of the at least one seal creating element 502 based on the at least one condition information. Further, the at least one characteristic may include a size, a shape, a stiffness, a strain, etc. Further, the modification in the at least one characteristic counters an effect of the at least one condition on the at least one watertight seal. Further, the processing device 604 may be configured for generating at least one characteristic information based on the determining. Further, the at least one device 606 may be coupled with the at least one seal creating element 502. Further, the at least one device 606 may be communicatively coupled with the processing device 604. Further, the at least one device 606 may be configured for delivering at least one stimulus to the at least one seal creating element 502 for modifying the at least one characteristic based on the at least one characteristic information. Further, the at least one device 606 generates the least one stimulus. Further, the at least one device 606 may include a heating device, a electric field generator, a magnetic field generator, an electromagnetic wave generator, etc. Further, the at least one stimulus may include heat, electric field, magnetic field, light, etc. Further, the modifying of the at least one characteristic preserves the at least one watertight seal in the at least one condition.

Further, in some embodiments, the cover 104 may be further coupled with at least one portion of the housing 102. Further, the cover 104 may be further configured for openably closing the at least one opening (such as an opening 1602) based on the transitioning between the at least one dispensing state and the at least one non-dispensing state. Further, the at least one opening (such as the opening 1602) may be opened in the at least one dispensing state for allowing the dispensing of the at least one medication (122 and 124) held by the at least one medication holder 106-108 from at least one holder opening (such as an holder opening 1604) comprised in the at least one medication holder 106-108. Further, the at least one opening (such as the opening 1602) may be closed in the at least one non-dispensing state for restricting the dispensing of the at least one medication (122 and 124) held by the at least one medication holder 106-108 from the at least one holder opening. Further, the at least one medication holder 106-108 may be in the at least one dispensing position.

Figure 14:
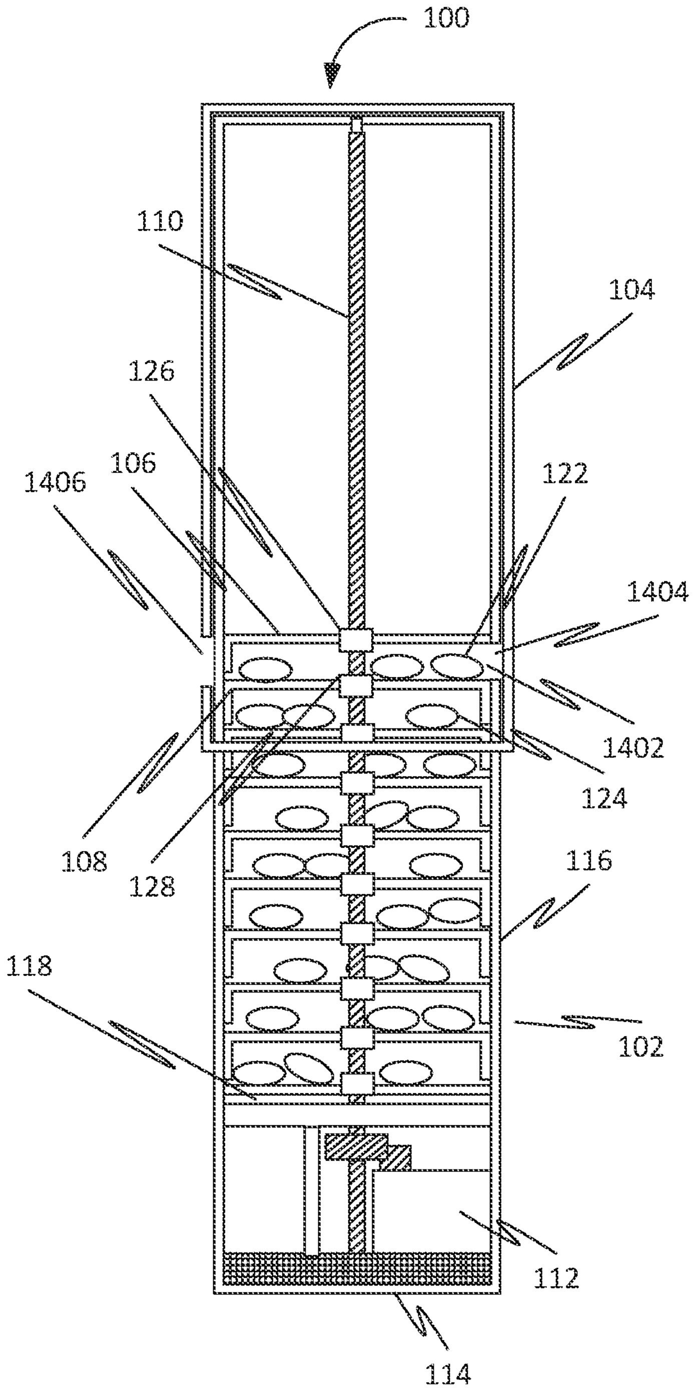
FIG. 14 is a front cross sectional view of the apparatus 100, in accordance with some embodiments.

Further, in some embodiments, the cover 104 may include at least one cover opening 1406, as shown in FIG. 14. Further, the transitioning of the cover 104 between the at least one dispensing state and the at least one non-dispensing state decoupably couples the at least one cover opening 1406 with the at least one opening (such as an opening 1404). Further, the at least one cover opening 1406 may be coupled with the at least one opening (such as the opening 1404) in the at least one dispensing state for allowing the dispensing of the at least one medication (122 and 124) held by the at least one medication holder 106-108 from at least one holder opening (such as an opening 1402) comprised in the at least one medication holder 106-108 through the at least one opening (such as the opening 1404) and the at least one cover opening 1406. Further, the at least one cover opening 1406 may be not coupled with the at least one opening (such as the opening 1404) in the at least one non-dispensing state for restricting the dispensing of the at least one medication (122 and 124) held by the at least one medication holder 106-108 from the at least one holder opening (such as the opening 1402) through the at least one opening (such as the opening 1404) and the at least one cover opening 1406. Further, the at least one medication holder 106-108 may be in the at least one dispensing position.

Further, in some embodiments, the cover 104 may be configured to be coupled with the holder driving element 110 using a cover coupling element 138 comprised in the cover 104. Further, the cover coupling element 138 may include a drive screw bearing. Further, the cover coupling element 138 may include a spring lock mechanism. Further, the holder driving element 110 may be configured for disengagably engaging with the cover 104 using the cover coupling element 138 based on the transitioning between at least one engaging position of the plurality of positions and a disengaging position of the plurality of position. Further, the holder driving element 110 may be engaged with the cover 104 in the at least one engaging position. Further, the holder driving element 110 may be disengaged from the cover 104 in the disengaging position. Further, the cover 104 may be transitionable between the at least one dispensing state and the at least one non-dispensing state in the disengaging position. Further, the cover 104 may be not transitionable between the at least one dispensing state and the at least one non-dispensing state in the at least one engaging position. Further, the transitioning between the at least one engaging position and the disengaging position may be based on the at least one dispensing information.

Figure 7:
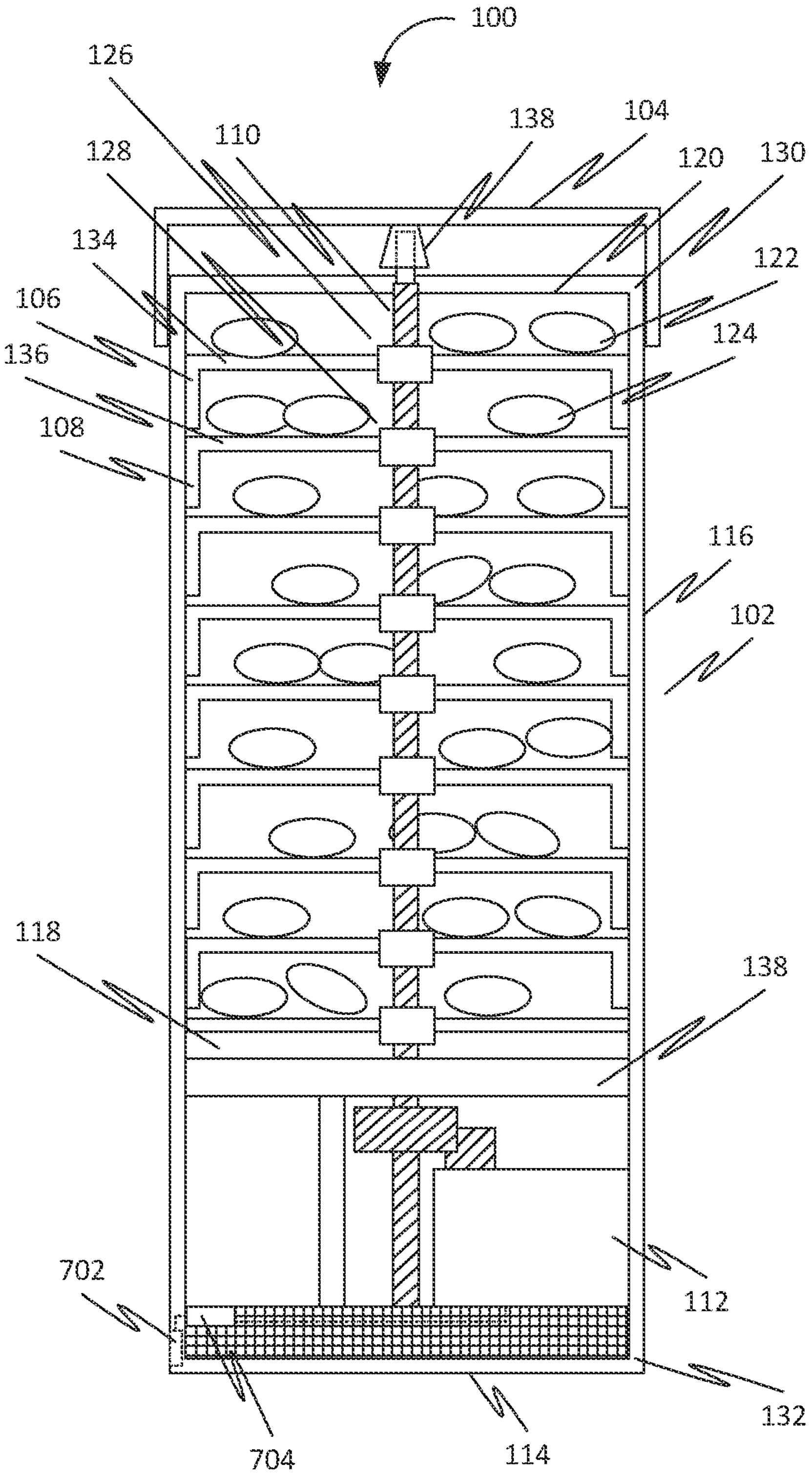
FIG. 7 is a front cross sectional view of the apparatus 100, in accordance with some embodiments.

In an embodiment, the apparatus 100 may include at least one external sensor 702 and a processing device 704, as shown in FIG. 7. Further, the at least one external sensor 702 may be disposed on an exterior of the housing 102. Further, the at least one external sensor 702 may include a pressure sensor, a moisture sensor, a temperature sensor, a radiation sensor, a contaminant sensor (air contaminant sensor), etc. Further, the at least one external sensor 702 may be configured for detecting a condition associated with an environment of an exterior of the apparatus 100. Further, the condition may include moisture, pressure, radiation, contaminant, temperature, etc. Further, the processing device 704 may be communicatively coupled with the at least one external sensor 702. Further, the processing device 704 may be configured for generating at least one condition information of the exterior of the apparatus 100 based on the detecting of the condition associated with the environment of the exterior of the apparatus 100. Further, the processing device 704 may be configured for determining at least one dispensing condition for the dispensing of the at least one medication (122 and 124) based on the at least one condition information. Further, the at least one dispensing condition corresponds to an acceptable limit for the condition. Further, the processing device 704 may be configured for generating at least one command for the at least one actuator 112 based on the determining. Further, the at least one actuator 112 may be communicatively coupled with the processing device 704. Further, the transitioning of the holder driving element 110 between the at least one engaging position and the disengaging position may be further based on the at least one command.

Figure 8:
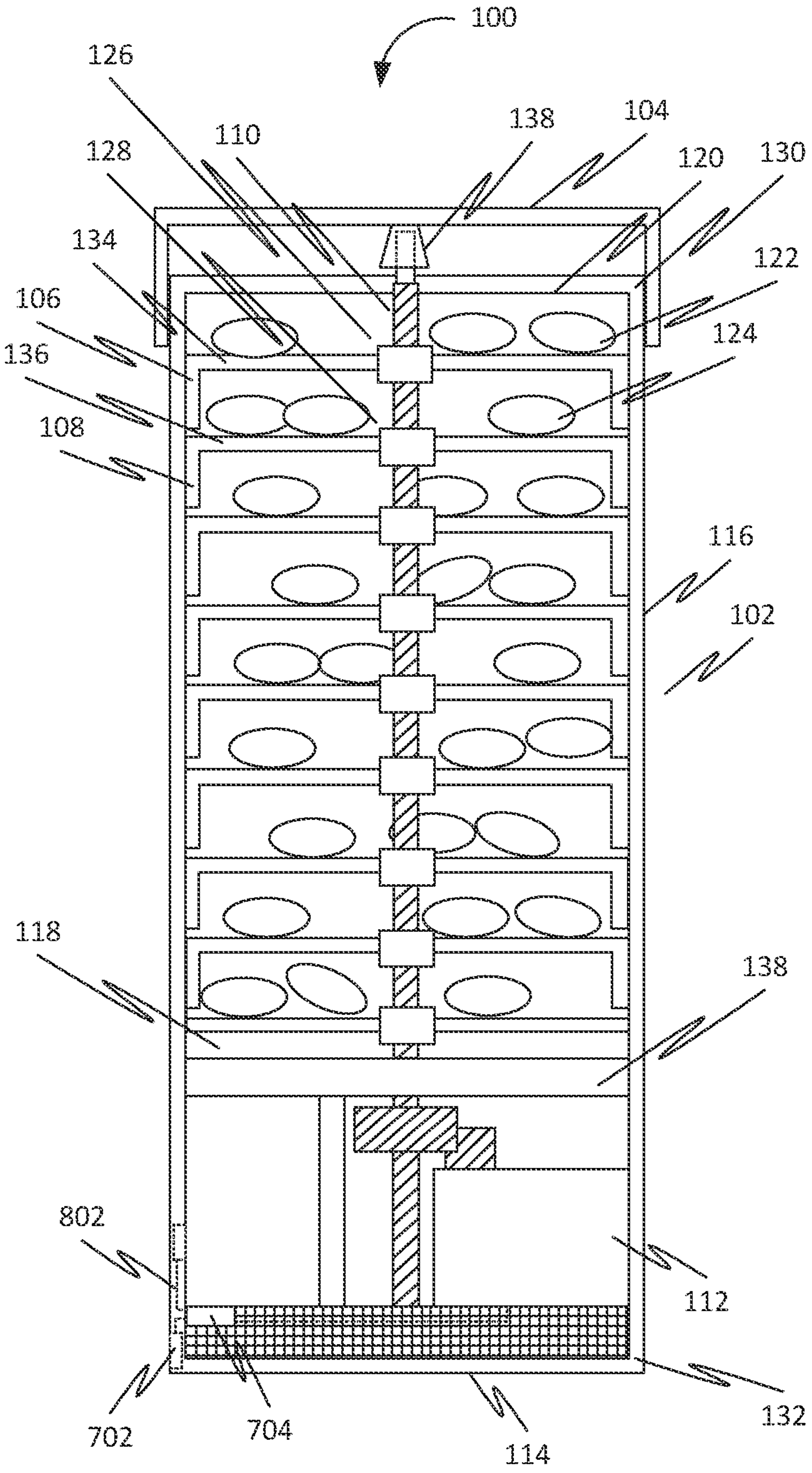
FIG. 8 is a front cross sectional view of the apparatus 100, in accordance with some embodiments.

In an embodiment, the apparatus 100 may include at least one internal sensor 802, as shown in FIG. 8. Further, the at least one internal sensor 802 may be disposed in an interior of the housing 102. Further, the at least one internal sensor 802 may be communicatively coupled with the processing device 704. Further, the at least one internal sensor 802 may include a pressure sensor, a moisture sensor, a temperature sensor, a radiation sensor, a contaminant sensor (air contaminant sensor, chemical contamination sensor, etc.), etc. Further, the at least one internal sensor 802 may be configured for detecting a condition associated with at least one of an environment of an interior of the apparatus 100 and the at least one medication (122 and 124). Further, the condition associated with the environment of the interior of the apparatus 100 may include moisture, pressure, radiation, contaminant, etc. Further, the condition associated with the at least one medication (122 and 124) may include a degradation, a spillage, an exposure, etc. Further, the generating of the at least one condition information may be further based on the detecting of the condition associated with at least one of the environment of the interior of the apparatus 100 and the at least one medication (122 and 124).

FIG. 2 is a front cross sectional view of the apparatus 100, in accordance with some embodiments.

Figure 3:
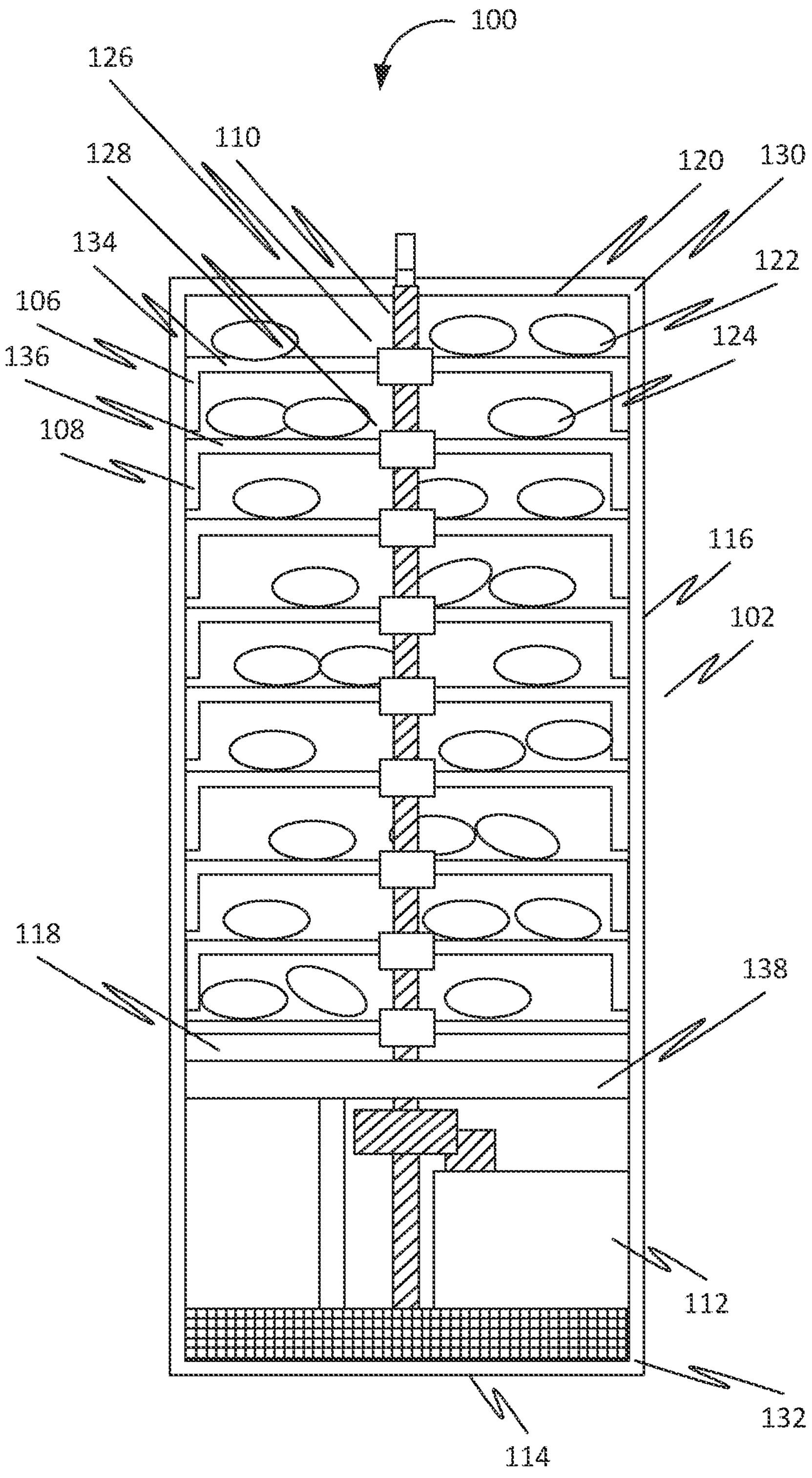
FIG. 3 is a front cross sectional view of the apparatus 100 without the cover 104, in accordance with some embodiments.

FIG. 3 is a front cross sectional view of the apparatus 100 without the cover 104, in accordance with some embodiments.

Figure 4:
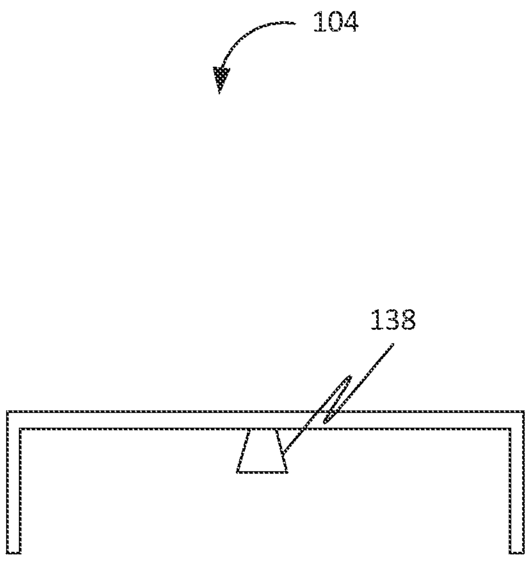
FIG. 4 is a front cross sectional view of the cover 104, in accordance with some embodiments.

FIG. 4 is a front cross sectional view of the cover 104, in accordance with some embodiments.

FIG. 5 is a bottom view of the cover 104 of the apparatus 100, in accordance with some embodiments.

FIG. 6 is a front cross sectional view of the apparatus 100, in accordance with some embodiments.

FIG. 7 is a front cross sectional view of the apparatus 100, in accordance with some embodiments.

FIG. 8 is a front cross sectional view of the apparatus 100, in accordance with some embodiments.

FIG. 9 is a top view of the housing 102 of the apparatus 100, in accordance with some embodiments.

FIG. 10 is a top view of a medication holder 1002 of the apparatus 100, in accordance with some embodiments. Further, the medication holder 1002 holds at least one medication 1004. Further, the medication holder 1002 may include a slot 1006 extending from a periphery 1008 of the medication holder 1002 to a location 1010 of the medication holder 1002. Further, the medication holder 1002 may include a coupling element 1012 comprised in the location 1010. Further, the coupling element 1012 may be a discontiguous ferrule.

Figure 11:
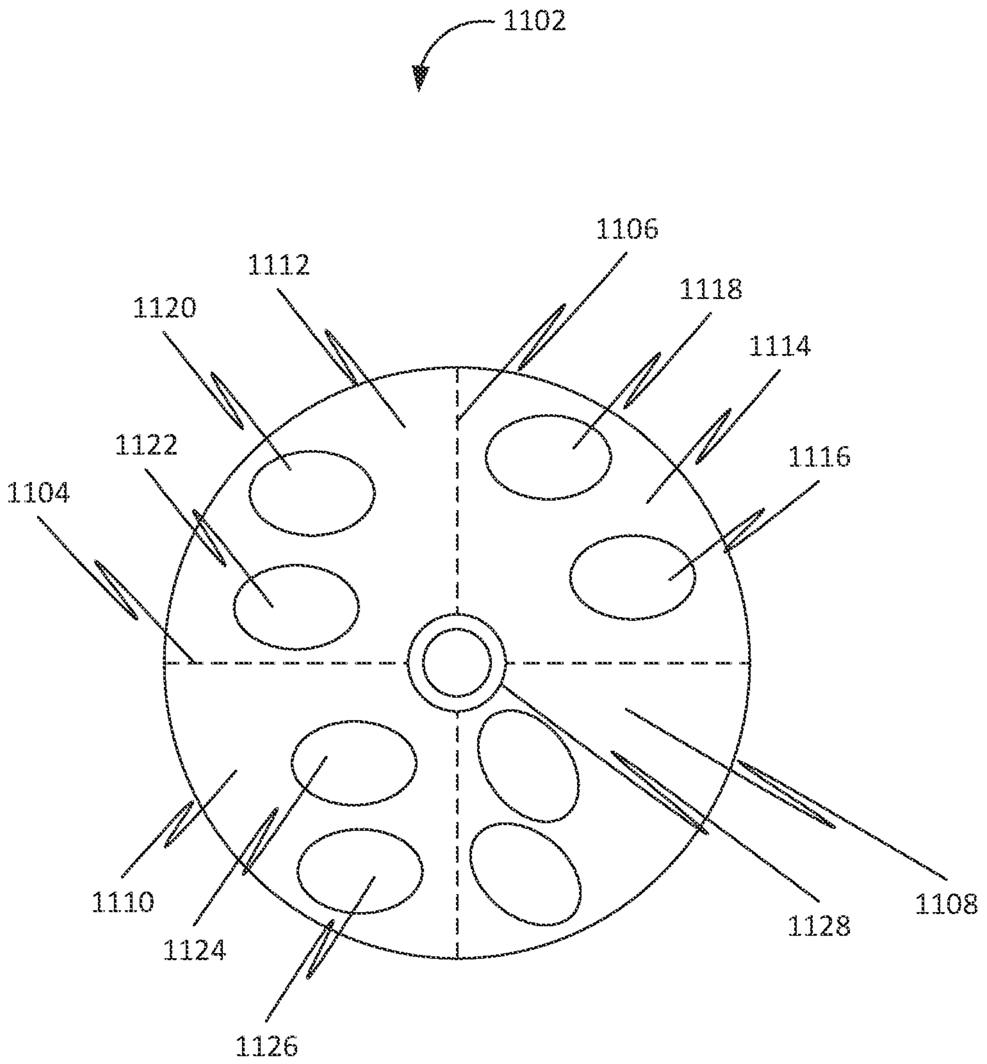
FIG. 11 is a top view of a medication holder 1102 of the apparatus 100, in accordance with some embodiments.

FIG. 11 is a top view of a medication holder 1102 of the apparatus 100, in accordance with some embodiments. Further, the medication holder 1102 may include at least one dosage divider 1104-1106 disposed on a top surface 1108 of the medication holder 1102. Further, the at least one dosage divider 1104-1106 defines a plurality of spaces 1110-1114 on the top surface 1108. Further, at least one of the plurality of spaces 1110-1114 holds at least one pill (1116-1118, 1120-1122, and 1124-1126) associated with at least one medication held by the medication holder 1102. Further, the medication holder 1102 may include a coupling element 1128

Figure 12:
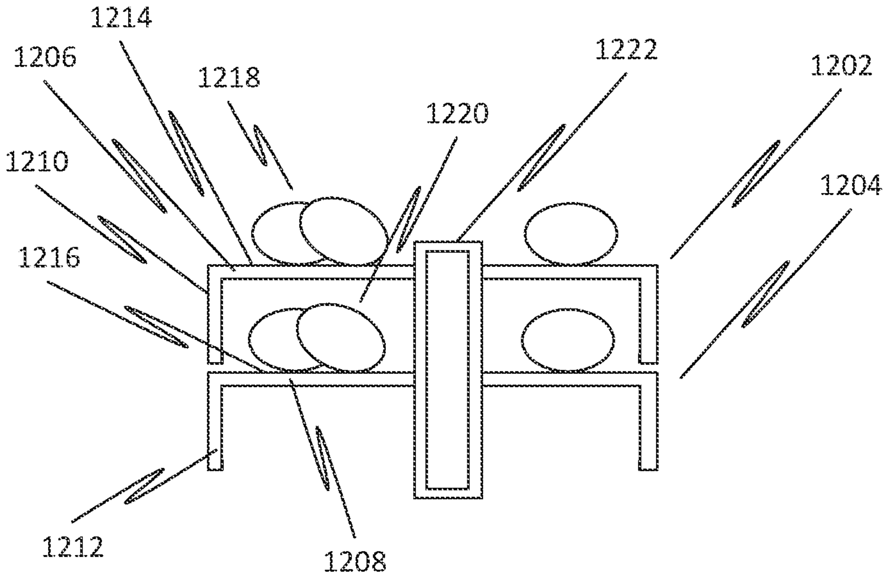
FIG. 12 is a front cross sectional view of a plurality of medication holders 1202-1204 of the apparatus 100, in accordance with some embodiments.

FIG. 12 is a front cross sectional view of a plurality of medication holders 1202-1204 of the apparatus 100, in accordance with some embodiments. Further, each of the plurality of medication holders 1202-1204 may include a base wall (1206 and 1208) and a side wall (1210 and 1212) peripherally extending from the base wall (1206 and 1208) towards a bottom side of the base wall (1206 and 1208). Further, the base wall (1206 and 1208) may include a top surface (1214 and 1216) on a top side of the base wall (1206 and 1208). Further, at least one medication (1218 and 1220) held by each of the plurality of medication holders 1202-1204 may be disposed on the top surface (1214 and 1216). Further, the plurality of medication holders 1202-1204 may include a coupling element 1222 connecting the plurality of medication holders 1202-1204.

Figure 13:
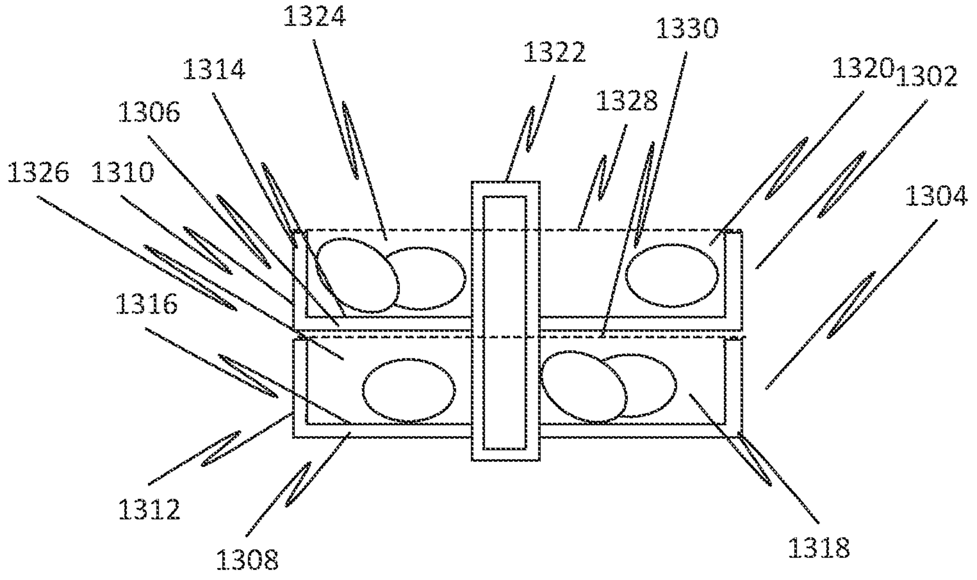
FIG. 13 is a front cross sectional view of a plurality of medication holders 1302-1304 of the apparatus 100, in accordance with some embodiments.

FIG. 13 is a front cross sectional view of a plurality of medication holders 1302-1304 of the apparatus 100, in accordance with some embodiments. Further, each of the plurality of medication holders 1302-1304 may include a base wall (1306 and 1308) and a side wall (1310 and 1312) peripherally extending from the base wall (1306 and 1308) towards a top side of the base wall (1306 and 1308) for forming a recess (1324 and 1326). Further, the base wall (1306 and 1308) may include a top surface (1314 and 1316) on the top side of the base wall (1306 and 1308). Further, at least one medication (1318 and 1320) held by each of the plurality of medication holders 1302-1304 may be disposed on the top surface (1314 and 1316) in the recess (1324 and 1326). Further, the plurality of medication holders 1302-1304 may include a coupling element 1322 connecting the plurality of medication holders 1302-1304. Further, each of the plurality of medication holders 1302-1304 may include a cover (1328 and 1330) for sealing the recess (1324 and 1326).

FIG. 14 is a front cross sectional view of the apparatus 100, in accordance with some embodiments.

Figure 15:
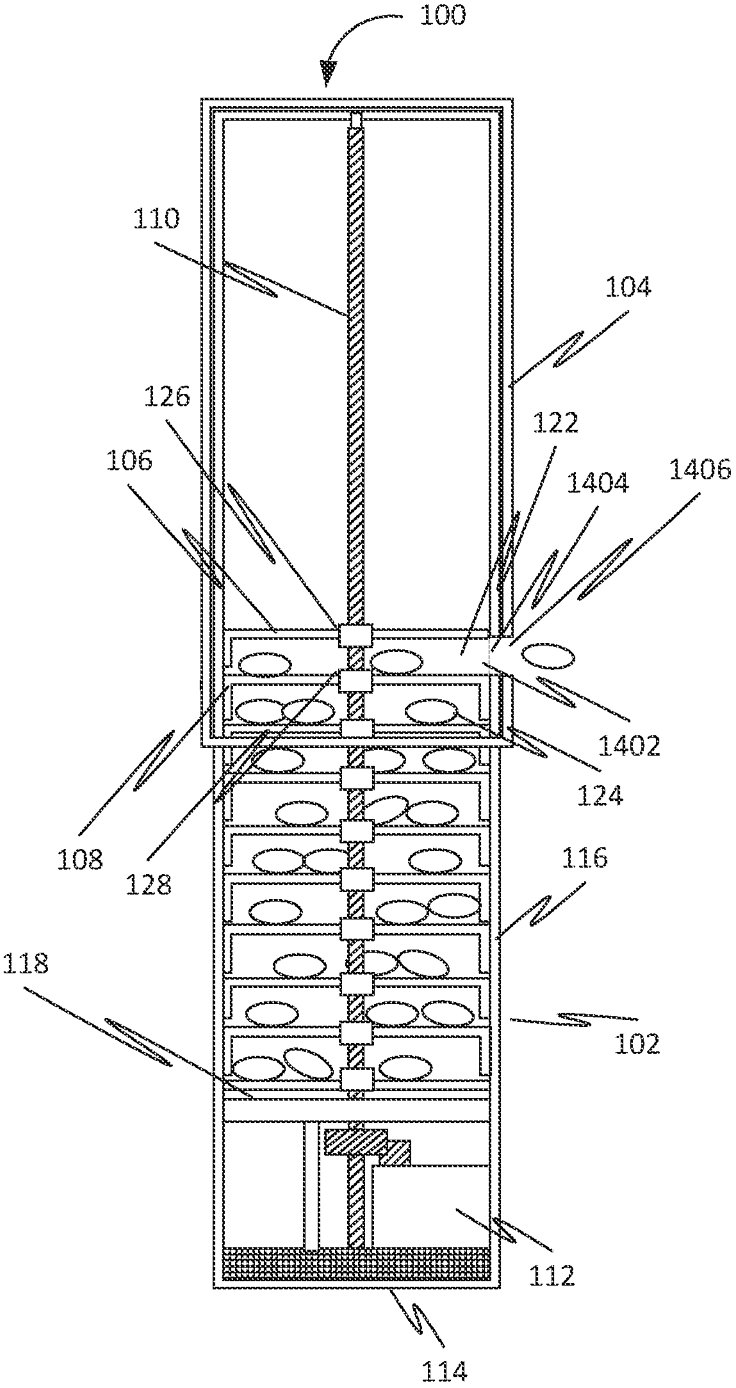
FIG. 15 is a front cross sectional view of the apparatus 100, in accordance with some embodiments.

FIG. 15 is a front cross sectional view of the apparatus 100, in accordance with some embodiments.

Figure 16:
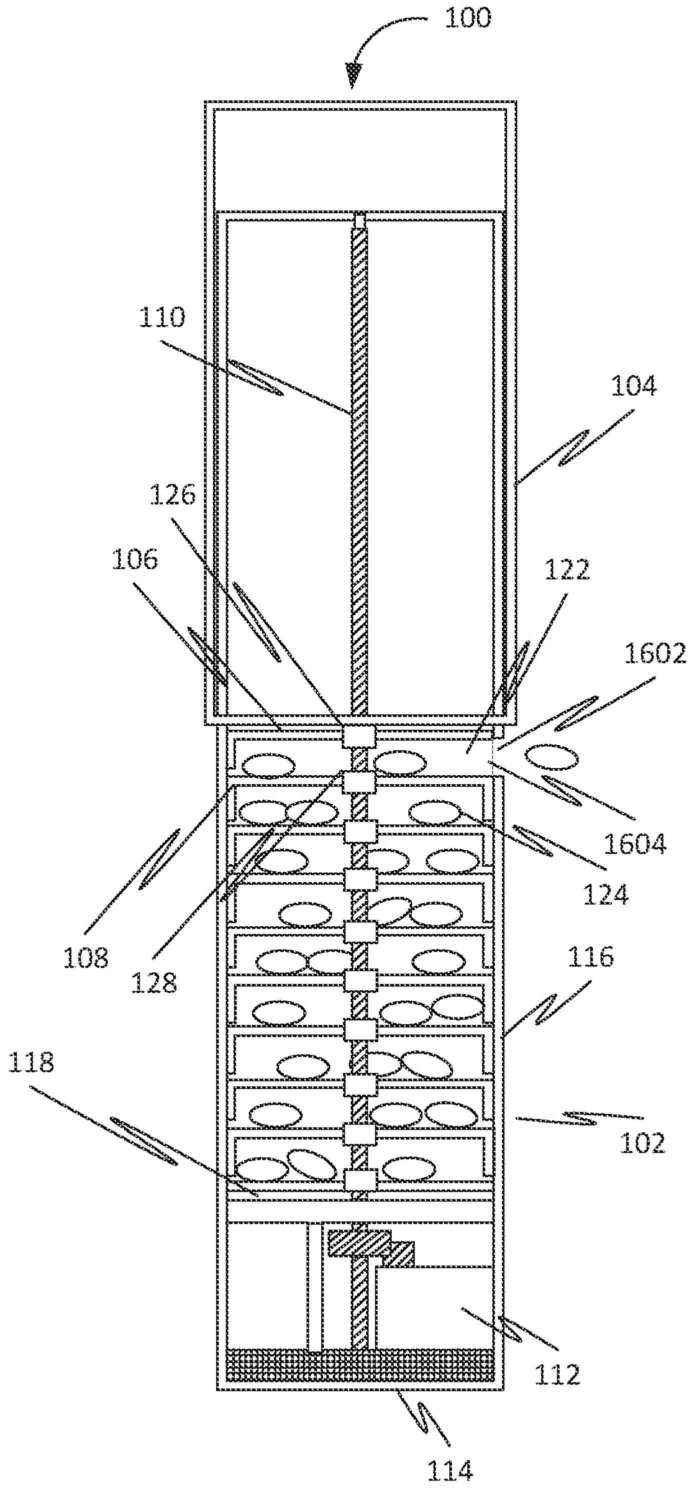
FIG. 16 is a front cross sectional view of the apparatus 100, in accordance with some embodiments.

FIG. 16 is a front cross sectional view of the apparatus 100, in accordance with some embodiments.

Figure 17:
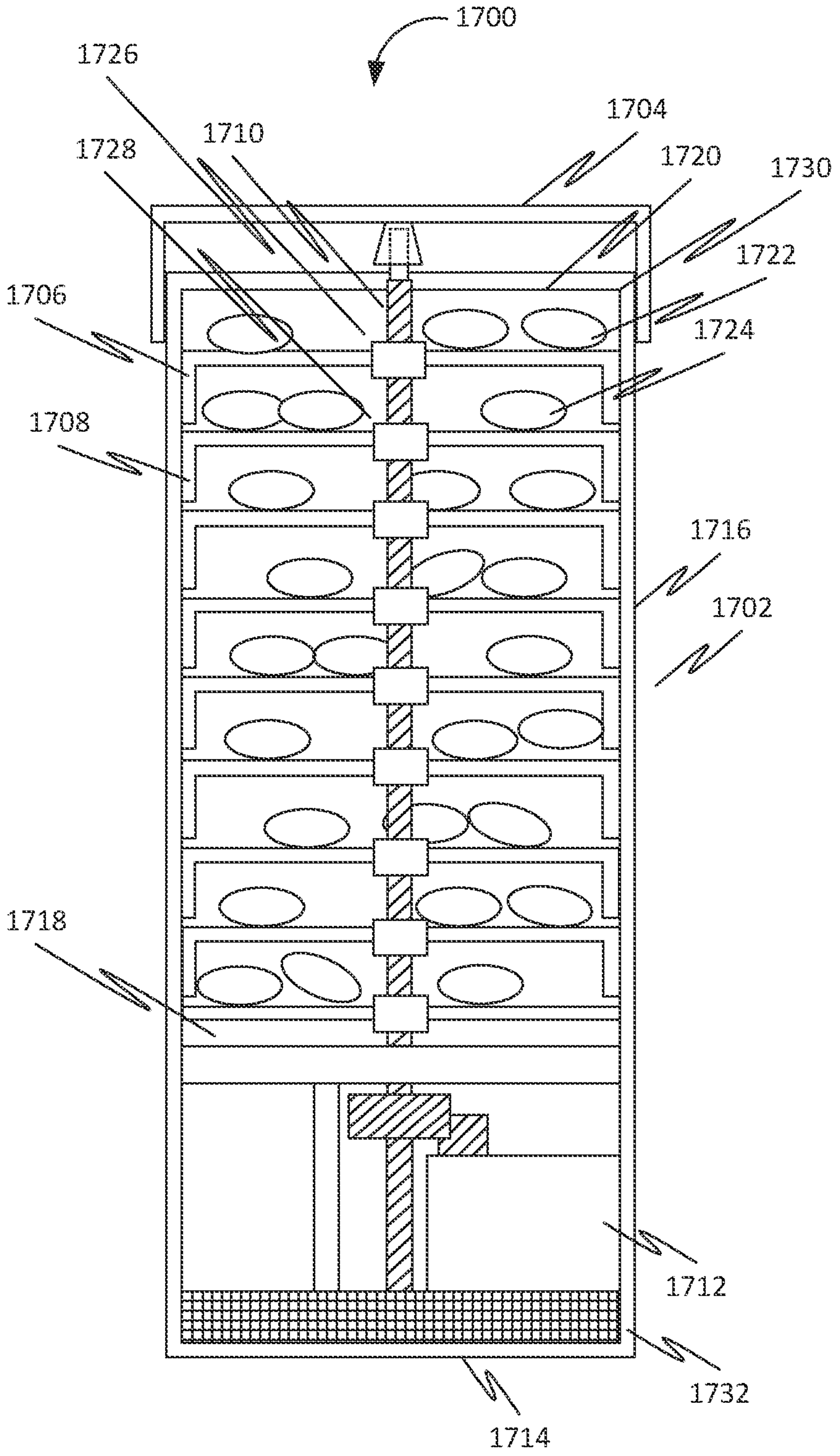
FIG. 17 is a front cross sectional view of an apparatus 1700 for facilitating dispensing of medications, in accordance with some embodiments.

FIG. 17 is a front cross sectional view of an apparatus 1700 for facilitating dispensing of medications, in accordance with some embodiments. Accordingly, the apparatus 1700 may include a housing 1702, a cover 1704, at least one medication holder 1706-1708, a holder driving element 1710, and at least one actuator 1712.

Further, the housing 1702 may include a housing base wall 1714 and a housing side wall 1716 peripherally extending from the housing base wall 1714 defining an interior space 1718. Further, the housing side wall 1716 may include at least one opening 1720 leading into the interior space 1718. Further, the housing side wall 1716 may include a top end 1730 and a bottom end 1732. Further, the bottom end 1732 of the housing side wall 1716 may be peripherally attached to the housing base wall 1714. Further, the top end 1730 defines the at least one opening 1720.

Further, the cover 1704 may be configured to be coupled with the housing 1702 for closing the at least one opening 1720. Further, at least one of the housing 1702 and the cover 1704 may be transitionable between at least one dispensing state and at least one non-dispensing state. Further, the cover 1704 may be configured to be removably coupled with the housing 1702 for removably closing the at least one opening 1720. Further, the cover 1704 closes the at least one opening 1720 in the at least one non-dispensing state. Further, the cover 1704 does not close the at least one opening 1720 in the at least one dispensing state.

Further, the at least one medication holder 1706-1708 may be disposed in the interior space 1718. Further, each of the at least one medication holder 1706-1708 holds at least one medication (1722 and 1724). Further, the at least one medication (1722 and 1724) held by the at least one medication holder 1706-1708 may be dispensable through the at least one opening 1720 in the at least one dispensing state. Further, the at least one medication (1722 and 1724) held by the at least one medication holder 1706-1708 may be not dispensable through the at least one opening 1720 in the at least one non-dispensing state.

Further, the holder driving element 1710 may be disposed in the interior space 1718. Further, each of the at least one medication holder 1706-1708 may include a coupling element (1726 and 1728) for movably coupling each of the at least one medication holder 1706-1708 with the holder driving element 1710 using the coupling element (1726 and 1728).

Further, the at least one actuator 1712 may be disposed in the interior space 1718. Further, the at least one actuator 1712 may be operatively coupled with the holder driving element 1710. Further, the at least one actuator 1712 may be configured for transitioning the holder driving element 1710 between a plurality of positions based on at least one dispensing information. Further, the transitioning of the holder driving element 1710 moves the at least one medication holder 1706-1708 between at least one non-dispensable position and at least one dispensable position. Further, the at least one medication (1722 and 1724) held by the at least one medication holder 1706-1708 may be accessible for dispensing in the at least one dispensable position. Further, the at least one medication (1722 and 1724) held by the at least one medication holder 1706-1708 may be not accessible for the dispensing in the at least one non-dispensable position.

Figure 18:
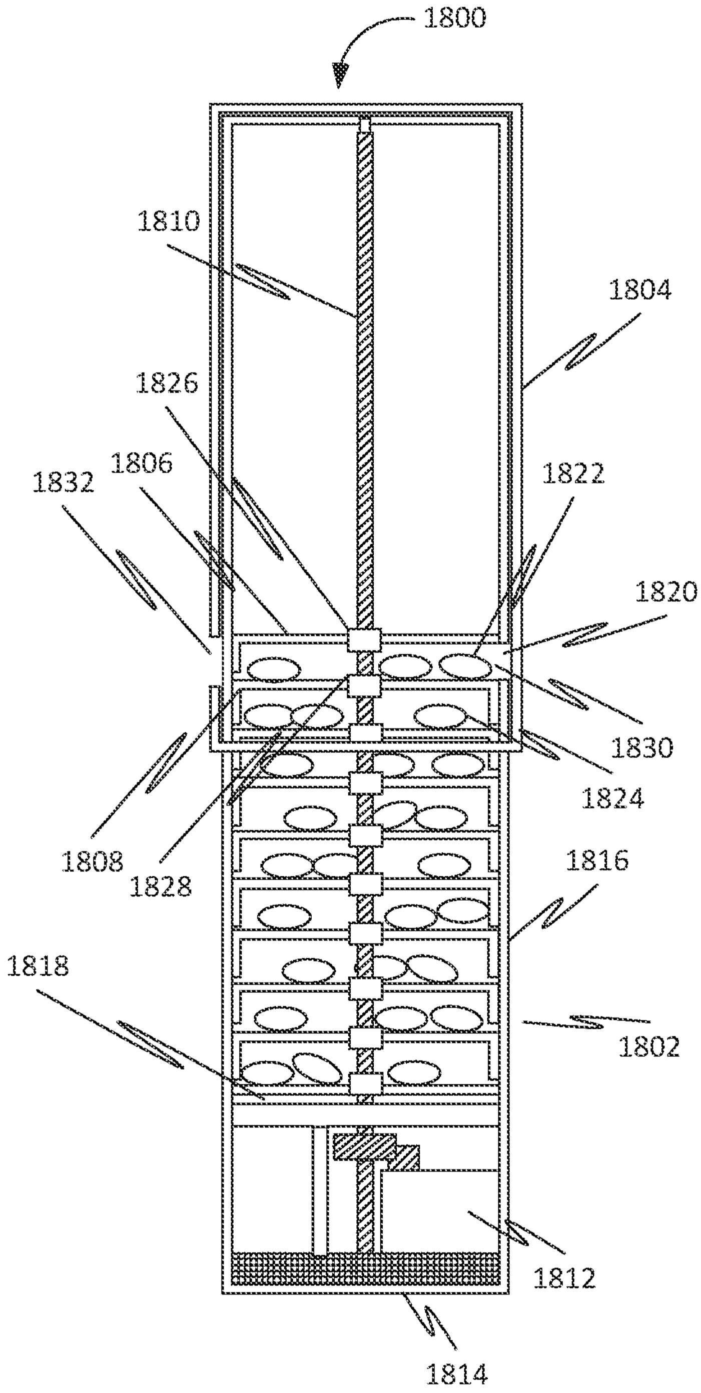
FIG. 18 is a front cross sectional view of an apparatus 1800 for facilitating dispensing of medications, in accordance with some embodiments.

FIG. 18 is a front cross sectional view of an apparatus 1800 for facilitating dispensing of medications, in accordance with some embodiments. Accordingly, the apparatus 1800 may include a housing 1802, a cover 1804, at least one medication holder 1806-1808, a holder driving element 1810, and at least one actuator 1812.

Further, the housing 1802 may include a housing base wall 1814 and a housing side wall 1816 peripherally extending from the housing base wall 1814 defining an interior space 1818. Further, the housing side wall 1816 may include at least one opening 1820 leading into the interior space 1818.

Further, the cover 1804 may be configured to be coupled with the housing 1802 for closing the at least one opening 1820. Further, at least one of the housing 1802 and the cover 1804 may be transitionable between at least one dispensing state and at least one non-dispensing state. Further, the cover 1804 may be configured to be removably coupled with the housing 1802 for removably closing the at least one opening 1820. Further, the cover 1804 closes the at least one opening 1820 in the at least one non-dispensing state. Further, the cover 1804 does not close the at least one opening 1820 in the at least one dispensing state.

Further, the at least one medication holder 1806-1808 may be disposed in the interior space 1818. Further, each of the at least one medication holder 1806-1808 holds at least one medication (1822 and 1824). Further, the at least one medication (1822 and 1824) held by the at least one medication holder 1806-1808 may be dispensable through the at least one opening 1820 in the at least one dispensing state. Further, the at least one medication (1822 and 1824) held by the at least one medication holder 1806-1808 may be not dispensable through the at least one opening 1820 in the at least one non-dispensing state.

Further, the holder driving element 1810 may be disposed in the interior space 1818. Further, each of the at least one medication holder 1806-1808 may include a coupling element (1826 and 1828) for movably coupling each of the at least one medication holder 1806-1808 with the holder driving element 1810 using the coupling element (1826 and 1828).

Further, the at least one actuator 1812 may be disposed in the interior space 1818. Further, the at least one actuator 1812 may be operatively coupled with the holder driving element 1810. Further, the at least one actuator 1812 may be configured for transitioning the holder driving element 1810 between a plurality of positions based on at least one dispensing information. Further, the transitioning of the holder driving element 1810 moves the at least one medication holder 1806-1808 between at least one non-dispensable position and at least one dispensable position. Further, the at least one medication (1822 and 1824) held by the at least one medication holder 1806-1808 may be accessible for dispensing in the at least one dispensable position. Further, the at least one medication (1822 and 1824) held by the at least one medication holder 1806-1808 may be not accessible for the dispensing in the at least one non-dispensable position. Further, the cover 1804 may include at least one cover opening 1832. Further, the transitioning of the cover 1804 between the at least one dispensing state and the at least one non-dispensing state decoupably couples the at least one cover opening 1832 with the at least one opening 1820. Further, the at least one cover opening 1832 may be coupled with the at least one opening 1820 in the at least one dispensing state for allowing the dispensing of the at least one medication (1822 and 1824) held by the at least one medication holder 1806-1808 from at least one holder opening 1830 comprised in the at least one medication holder 1806-1808 through the at least one opening 1820 and the at least one cover opening 1832. Further, the at least one cover opening 1832 may not be coupled with the at least one opening 1820 in the at least one non-dispensing state for restricting the dispensing of the at least one medication (1822 and 1824) held by the at least one medication holder 1806-1808 from the at least one holder opening 1830 through the at least one opening 1820 and the at least one cover opening 1832. Further, the at least one medication holder 1806-1808 may be in the at least one dispensing position.

Figure 19:
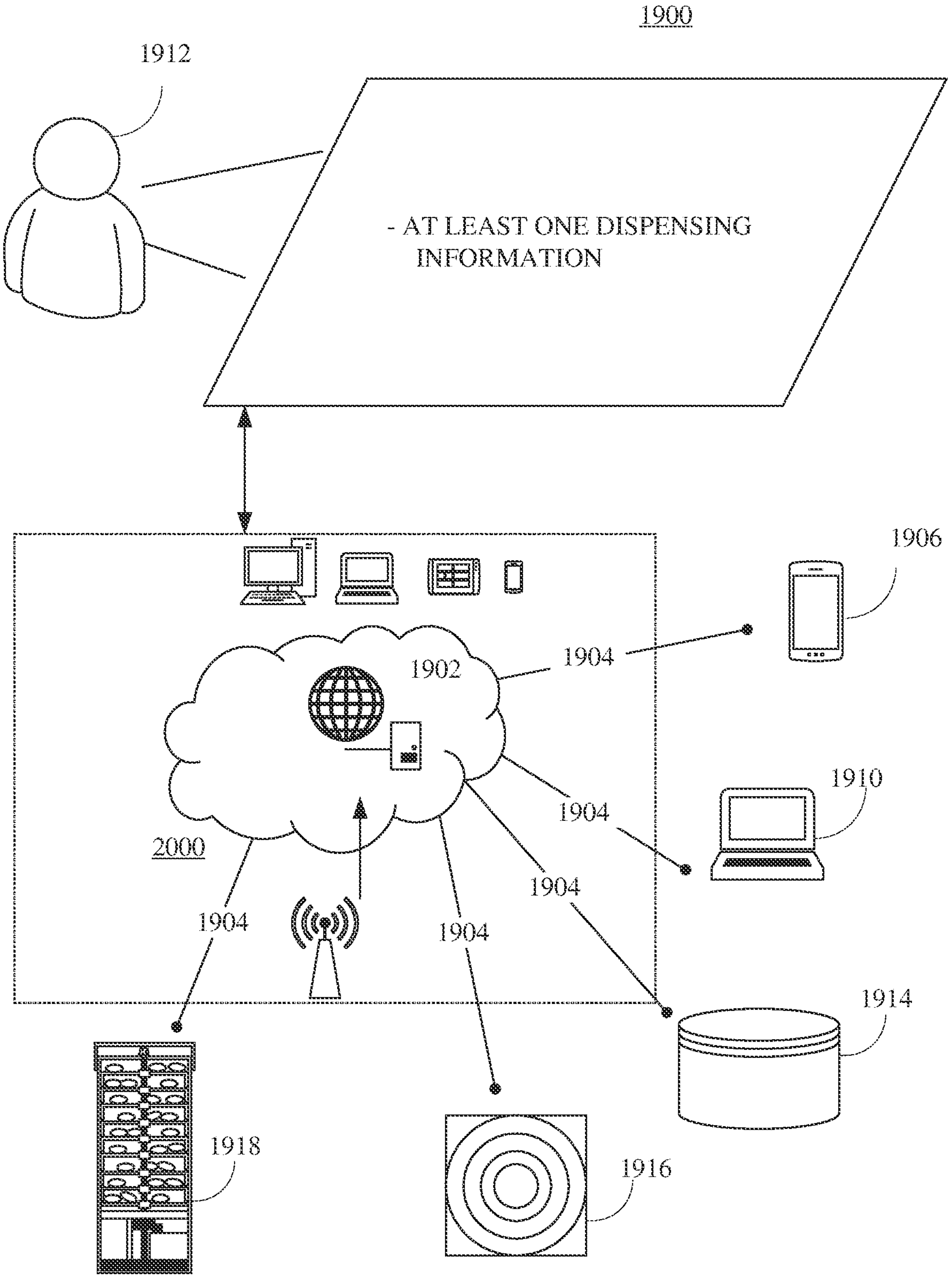
FIG. 19 is an illustration of an online platform 1900 consistent with various embodiments of the present disclosure.

FIG. 19 is an illustration of an online platform 1900 consistent with various embodiments of the present disclosure. By way of non-limiting example, the online platform 1900 to facilitate dispensing of medications may be hosted on a centralized server 1902, such as, for example, a cloud computing service. The centralized server 1902 may communicate with other network entities, such as, for example, a mobile device 1906 (such as a smartphone, a laptop, a tablet computer, etc.), other electronic devices 1910 (such as desktop computers, server computers, etc.), databases 1914, sensors 1916, and an apparatus 1918 (such as the apparatus 100, the apparatus 1700, the apparatus 1800, etc.) over a communication network 1904, such as, but not limited to, the Internet. Further, users of the online platform 1900 may include relevant parties such as, but not limited to, end-users, administrators, service providers, service consumers, and so on. Accordingly, in some instances, electronic devices operated by the one or more relevant parties may be in communication with the platform.

A user 1912, such as the one or more relevant parties, may access online platform 1900 through a web based software application or browser. The web based software application may be embodied as, for example, but not be limited to, a website, a web application, a desktop application, and a mobile application compatible with a computing device 2000.

Figure 20:
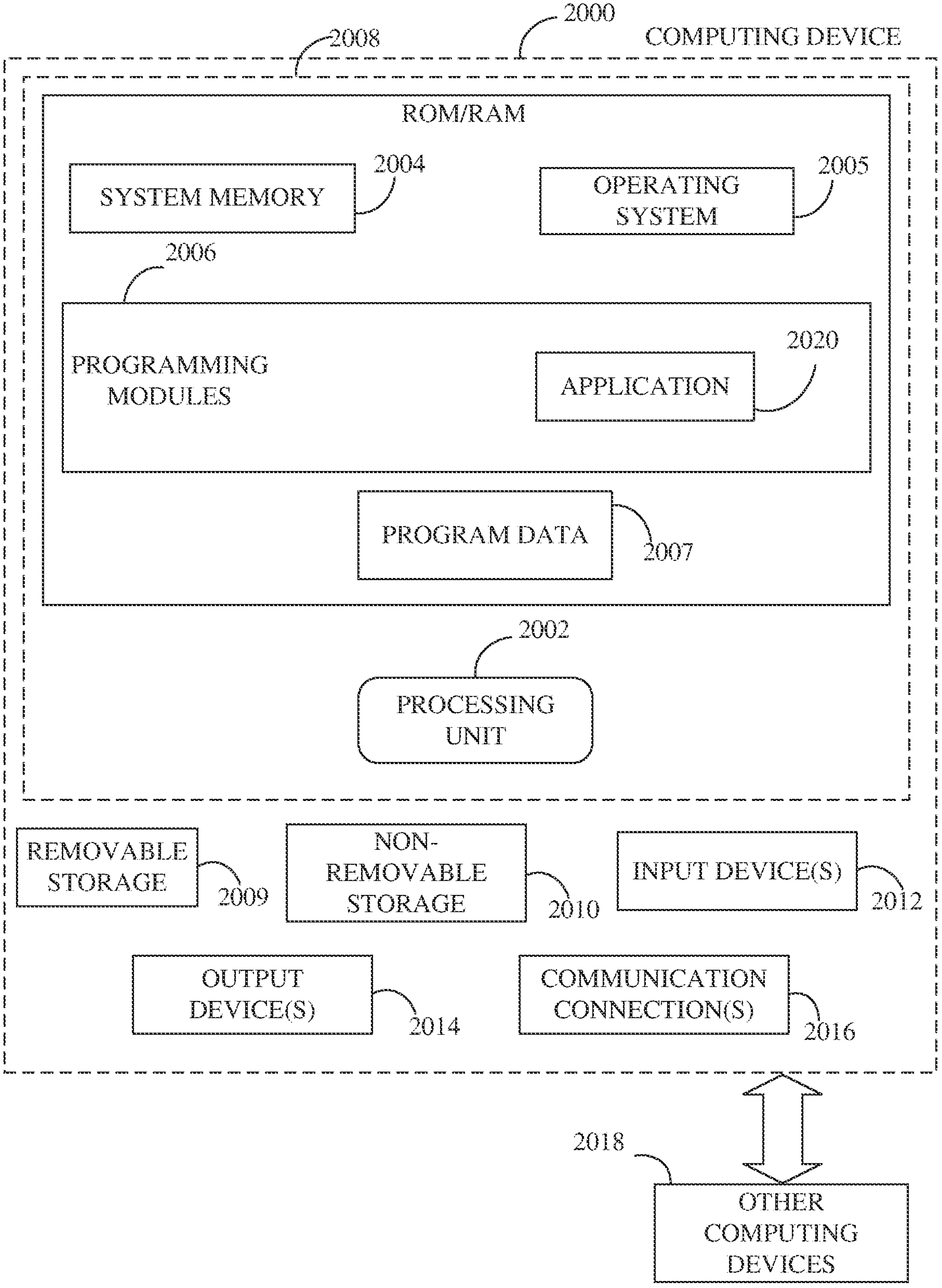
FIG. 20 is a block diagram of a computing device 2000 for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g. random-access memory (RAM)), non-volatile (e.g. read-only memory (ROM)), flash memory, or any combination.

System memory 2004 may include operating system 2005, one or more programming modules 2006, and may include a program data 2007. Operating system 2005, for example, may be suitable for controlling computing device 2000's operation. In one embodiment, programming modules 2006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and non-volatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet.

Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 (e.g., application 2020 such as a media player) may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for facilitating dispensing of medications, the apparatus comprising:

a housing comprising a housing base wall and a housing side wall peripherally extending from the housing base wall defining an interior space, wherein the housing side wall comprises at least one opening leading into the interior space;

a cover configured to be coupled with the housing for closing the at least one opening, wherein at least one of the housing and the cover is transitionable between at least one dispensing state and at least one non-dispensing state;

at least one medication holder disposed in the interior space, wherein each of the at least one medication holder holds at least one medication, wherein the at least one medication held by the at least one medication holder is dispensable through the at least one opening in the at least one dispensing state, wherein the at least one medication held by the at least one medication holder is not dispensable through the at least one opening in the at least one non-dispensing state;

a holder driving element disposed in the interior space, wherein each of the at least one medication holder comprises a coupling element for movably coupling each of the at least one medication holder with the holder driving element using the coupling element; and at least one actuator disposed in the interior space, wherein the at least one actuator is operatively coupled with the holder driving element, wherein the at least one actuator is configured for transitioning the holder driving element between a plurality of positions based on at least one dispensing information, wherein the transitioning of the holder driving element moves the at least one medication holder between at least one non-dispensable position and at least one dispensable position, wherein the at least one medication held by the at least one medication holder is accessible for dispensing in the at least one dispensable position, wherein the at least one medication held by the at least one medication holder is not accessible for the dispensing in the at least one non-dispensable position.

2. The apparatus of claim 1, wherein the housing side wall comprises a top end and a bottom end, wherein the bottom end of the housing side wall is peripherally attached to the housing base wall, wherein the top end defines the at least one opening.

3. The apparatus of claim 1, wherein the holder driving element comprises a shaft extending between a bottom end and a top end, wherein the shaft is threaded, wherein the coupling element comprises a threaded coupling element, wherein the threaded coupling element of each of the at least one medication holder is threadedly coupled with the shaft, wherein the movably coupling of each of the at least one medication holder with the holder driving element is based on the threadedly coupling of the threaded coupling element with the shaft.

4. The apparatus of claim 1, wherein the transitioning of the holder driving element comprises rotating the holder driving element between the plurality of positions, wherein the rotating of the holder driving element moves the at least one medication holder between the at least one non-dispensable position and the at least one dispensable position.

5. The apparatus of claim 1, wherein the at least one medication holder comprises a base wall, wherein the base wall is circularly shaped.

6. The apparatus of claim 1, wherein the at least one medication holder comprises at least one slot extending from a periphery of the at least one medication holder to at least one location on the at least one medication holder, wherein the coupling element is comprised in the at least one location of the at least one medication holder, wherein the holder driving element comprises a shaft extending between a first end and a second end, wherein the at least one medication holder is laterally positioned on the shaft by inserting the at least one medication holder into the shaft through the at least one slot for coupling the at least one medication holder to the holder driving element using the coupling element.

7. The apparatus of claim 1 further comprises a driving lock mechanism disposed in the interior space, wherein the driving lock mechanism is coupled with the holder driving element, wherein the driving lock mechanism is configured to be transitioned between an engaged state and a disengaged state, wherein the driving lock mechanism allows the transitioning of the holder driving element in the disengaged state, wherein the driving lock mechanism prevents the transitioning of the holder driving element in the engaged state.

8. The apparatus of claim 7, wherein the at least one actuator is further operatively coupled with the driving lock mechanism, wherein the at least one actuator is configured for:

transitioning the driving lock mechanism from the engaged state to the disengaged state before the transitioning of the holder driving element; and transitioning the driving lock mechanism from the disengaged state to the engaged state after the transitioning of the holder driving element for preventing a transitioning of the holder driving element based on at least one external force applicable to the holder driving element.

9. The apparatus of claim 1, wherein the housing comprises a wedge disposed on an interior surface of the housing side wall, wherein the wedge extends along a length of the interior space, wherein the wedge is engaged with a recess comprised in the at least one medication holder, wherein the transitioning of the holder driving element comprises rotating the holder driving element between the plurality of positions, wherein the at least one of medication holder moves along the length of the interior space between the at least one non-dispensable position and the at least one dispensable position based on the rotating of the holder driving element and the engaging of the wedge with the recess.

10. The apparatus of claim 1, wherein the cover is configured to be removably coupled with the housing for openably closing the at least one opening, wherein the cover closes the at least one opening in the at least one non-dispensing state, wherein the cover opens the at least one opening in the at least one dispensing state.

11. The apparatus of claim 1, wherein the cover is configured for forming at least one watertight seal with at least one portion of the housing based on the coupling of the cover with the housing.

12. The apparatus of claim 1, wherein the cover comprises at least one seal creating element, wherein the at least one seal creating element forms the at least one watertight seal between at least one cover surface of the cover and at least one surface of the at least one portion of the housing.

13. The apparatus of claim 12 further comprising:

at least one sensor disposed on the housing, wherein the at least one sensor is configured for detecting at least one condition detrimental to the at least one watertight seal;

a processing device communicatively coupled with the at least one sensor, wherein the processing device is configured for:

generating at least one condition information associated with the at least one condition based on the detecting;

determining a modification in at least one characteristic of the at least one seal creating element based on the at least one condition information, wherein the modification in the at least one characteristic counters an effect of the at least one condition on the at least one watertight seal; and generating at least one characteristic information based on the determining; and at least one device coupled with the at least one seal creating element, wherein the at least one device is communicatively coupled with the processing device, wherein the at least one device is configured for delivering at least one stimulus to the at least one seal creating element for modifying the at least one characteristic based on the at least one characteristic information, wherein the modifying of the at least one characteristic preserves the at least one watertight seal in the at least one condition.

14. The apparatus of claim 1, wherein the cover is further coupled with at least one portion of the housing, wherein the cover is further configured for openably closing the at least one opening based on the transitioning between the at least one dispensing state and the at least one non-dispensing state, wherein the at least one opening is opened in the at least one dispensing state for allowing the dispensing of the at least one medication held by the at least one medication holder from at least one holder opening comprised in the at least one medication holder, wherein the at least one opening is closed in the at least one non-dispensing state for restricting the dispensing of the at least one medication held by the at least one medication holder from the at least one holder opening, wherein the at least one medication holder is in the at least one dispensing position.

15. The apparatus of claim 1, wherein the cover comprises at least one cover opening, wherein the transitioning of the cover between the at least one dispensing state and the at least one non-dispensing state decoupably couples the at least one cover opening with the at least one opening, wherein the at least one cover opening is coupled with the at least one opening in the at least one dispensing state for allowing the dispensing of the at least one medication held by the at least one medication holder from at least one holder opening comprised in the at least one medication holder through the at least one opening and the at least one cover opening, wherein the at least one cover opening is not coupled with the at least one opening in the at least one non-dispensing state for restricting the dispensing of the at least one medication held by the at least one medication holder from the at least one holder opening through the at least one opening and the at least one cover opening, wherein the at least one medication holder is in the at least one dispensing position.

16. The apparatus of claim 1, wherein the cover is configured to be coupled with the holder driving element using a cover coupling element comprised in the cover, wherein the holder driving element is configured for disengagably engaging with the cover using the cover coupling element based on the transitioning between at least one engaging position of the plurality of positions and a disengaging position of the plurality of position, wherein the holder driving element is engaged with the cover in the at least one engaging position, wherein the holder driving element is disengaged from the cover in the disengaging position, wherein the cover is transitionable between the at least one dispensing state and the at least one non-dispensing state in the disengaging position, wherein the cover is not transitionable between the at least one dispensing state and the at least one non-dispensing state in the at least one engaging position, wherein the transitioning between the at least one engaging position and the disengaging position is based on the at least one dispensing information.

17. The apparatus of claim 16 further comprising:

at least one external sensor disposed on an exterior of the housing, wherein the at least one sensor is configured for detecting a condition associated with an environment of an exterior of the apparatus;

a processing device communicatively coupled with the at least one external sensor, wherein the processing device is configured for:

generating at least one condition information of the exterior of the apparatus based on the detecting of the condition associated with the environment of the exterior of the apparatus;

determining at least one dispensing condition for the dispensing of the at least one medication based on the at least one condition information; and generating at least one command for the at least one actuator based on the determining, wherein the at least one actuator is communicatively coupled with the processing device, wherein the transitioning of the holder driving element between the at least one engaging position and the disengaging position is further based on the at least one command.

18. The apparatus of claim 17 further comprising at least one internal sensor disposed in an interior of the housing, wherein the at least one internal sensor is communicatively coupled with the processing device, wherein the at least one internal sensor is configured for detecting a condition associated with at least one of an environment of an interior of the apparatus and the at least one medication, wherein the generating of the at least one condition information is further based on the detecting of the condition associated with at least one of the environment of the interior of the apparatus and the at least one medication.

19. An apparatus for facilitating dispensing of medications, the apparatus comprising:

a housing comprising a housing base wall and a housing side wall peripherally extending from the housing base wall defining an interior space, wherein the housing side wall comprises at least one opening leading into the interior space, wherein the housing side wall comprises a top end and a bottom end, wherein the bottom end of the housing side wall is peripherally attached to the housing base wall, wherein the top end defines the at least one opening;

a cover configured to be coupled with the housing for closing the at least one opening, wherein at least one of the housing and the cover is transitionable between at least one dispensing state and at least one non-dispensing state, wherein the cover is configured to be removably coupled with the housing for removably closing the at least one opening, wherein the cover closes the at least one opening in the at least one non-dispensing state, wherein the cover does not close the at least one opening in the at least one dispensing state;

at least one medication holder disposed in the interior space, wherein each of the at least one medication holder holds at least one medication, wherein the at least one medication held by the at least one medication holder is dispensable through the at least one opening in the at least one dispensing state, wherein the at least one medication held by the at least one medication holder is not dispensable through the at least one opening in the at least one non-dispensing state;

a holder driving element disposed in the interior space, wherein each of the at least one medication holder comprises a coupling element for movably coupling each of the at least one medication holder with the holder driving element using the coupling element; and at least one actuator disposed in the interior space, wherein the at least one actuator is operatively coupled with the holder driving element, wherein the at least one actuator is configured for transitioning the holder driving element between a plurality of positions based on at least one dispensing information, wherein the transitioning of the holder driving element moves the at least one medication holder between at least one non-dispensable position and at least one dispensable position, wherein the at least one medication held by the at least one medication holder is accessible for dispensing in the at least one dispensable position, wherein the at least one medication held by the at least one medication holder is not accessible for the dispensing in the at least one non-dispensable position.

20. An apparatus for facilitating dispensing of medications, the apparatus comprising:

a housing comprising a housing base wall and a housing side wall peripherally extending from the housing base wall defining an interior space, wherein the housing side wall comprises at least one opening leading into the interior space;

a cover configured to be coupled with the housing for closing the at least one opening, wherein at least one of the housing and the cover is transitionable between at least one dispensing state and at least one non-dispensing state;

at least one medication holder disposed in the interior space, wherein each of the at least one medication holder holds at least one medication, wherein the at least one medication held by the at least one medication holder is dispensable through the at least one opening in the at least one dispensing state, wherein the at least one medication held by the at least one medication holder is not dispensable through the at least one opening in the at least one non-dispensing state;

a holder driving element disposed in the interior space, wherein each of the at least one medication holder comprises a coupling element for movably coupling each of the at least one medication holder with the holder driving element using the coupling element; and at least one actuator disposed in the interior space, wherein the at least one actuator is operatively coupled with the holder driving element, wherein the at least one actuator is configured for transitioning the holder driving element between a plurality of positions based on at least one dispensing information, wherein the transitioning of the holder driving element moves the at least one medication holder between at least one non-dispensable position and at least one dispensable position, wherein the at least one medication held by the at least one medication holder is accessible for dispensing in the at least one dispensable position, wherein the at least one medication held by the at least one medication holder is not accessible for the dispensing in the at least one non-dispensable position, wherein the cover comprises at least one cover opening, wherein the transitioning of the cover between the at least one dispensing state and the at least one non-dispensing state decoupably couples the at least one cover opening with the at least one opening, wherein the at least one cover opening is coupled with the at least one opening in the at least one dispensing state for allowing the dispensing of the at least one medication held by the at least one medication holder from at least one holder opening comprised in the at least one medication holder through the at least one opening and the at least one cover opening, wherein the at least one cover opening is not coupled with the at least one opening in the at least one non-dispensing state for restricting the dispensing of the at least one medication held by the at least one medication holder from the at least one holder opening through the at least one opening and the at least one cover opening, wherein the at least one medication holder is in the at least one dispensing position.

* * * * *